United States Patent
Engberg et al.

(10) Patent No.: US 9,654,298 B2
(45) Date of Patent: May 16, 2017

(54) SIGNATURE # EFFICIENT REAL TIME CREDENTIALS FOR OCSP AND DISTRIBUTED OCSP

(71) Applicant: Assa Abloy AB, Stockholm (SE)

(72) Inventors: David Engberg, San Francisco, CA (US); Phil Libin, San Francisco, CA (US); Silvio Micali, Brookline, MA (US)

(73) Assignee: Assa Abloy AB, Stockholm (SE)

( * ) Notice: Subject to any disclaimer, the term of this patent is extended or adjusted under 35 U.S.C. 154(b) by 0 days.

(21) Appl. No.: 15/251,220

(22) Filed: Aug. 30, 2016

(65) Prior Publication Data
US 2016/0373432 A1    Dec. 22, 2016

Related U.S. Application Data

(63) Continuation of application No. 14/703,176, filed on May 4, 2015, now Pat. No. 9,461,828, which is a
(Continued)

(51) Int. Cl.
*H04L 9/32* (2006.01)
*H04L 29/06* (2006.01)

(52) U.S. Cl.
CPC ........ *H04L 9/3268* (2013.01); *H04L 63/0823* (2013.01); *H04L 2209/56* (2013.01)

(58) Field of Classification Search
CPC .................................................... H04L 9/3268
See application file for complete search history.

(56) References Cited

U.S. PATENT DOCUMENTS 6,970,862 B2 * 11/2005 Kwan ................. G06Q 20/0855
7,318,155 B2 *  1/2008 Yellepeddy ........... H04L 9/3255
                                                             713/156
(Continued)

OTHER PUBLICATIONS

Iliadis et al.; Evaluating certificate status information mechanisms; Published in: Proceeding CCS '00 Proceedings of the 7th ACM conference on Computer and communications security; 2000; pp. 1-8; ACM Digital Library.*
(Continued)

*Primary Examiner* — Bradley Holder
(74) *Attorney, Agent, or Firm* — Muirhead and Saturnelli, LLC

(57) ABSTRACT

Providing information about digital certificate validity includes ascertaining digital certificate validity status for each of a plurality of digital certificates in a set of digital certificates, generating a plurality of artificially pre-computed messages about the validity status of at least a subset of the set of digital certificate of the plurality of digital certificates, where at least one of the messages indicates validity status of more than one digital certificate and digitally signing the artificially pre-computed messages to provide OCSP format responses that respond to OCSP queries about specific digital certificates in the set of digital certificates, where at least one digital signature is used in connection with an OCSP format response for more than one digital certificate. Generating and digitally signing may occur prior to any OCSP queries that are answered by any of the OCSP format responses. Ascertaining digital certificate validity status may include obtaining authenticated information about digital certificates.

17 Claims, 17 Drawing Sheets

Related U.S. Application Data continuation of application No. 11/036,220, filed on Jan. 10, 2005, now abandoned.

(60) Provisional application No. 60/536,817, filed on Jan. 15, 2004, provisional application No. 60/535,666, filed on Jan. 9, 2004.

(56) References Cited

U.S. PATENT DOCUMENTS

| | | | | |
|---|---|---|---|---|
| 2002/0184182 | A1* | 12/2002 | Kwan | G06Q 20/0855 |
| 2004/0111607 | A1* | 6/2004 | Yellepeddy | H04L 9/3255 |
| | | | | 713/155 |

OTHER PUBLICATIONS

Faldella et al.; A novel approach to on-line status authentication of public-key certificates; Published in: Computer Security Applications, 2000. ACSAC '00. 16th Annual Conference; Date of Conference: Dec. 2000; pp. 270-277; IEEE Xplore.*

* cited by examiner

FIGURE 14    430

SIGNATURE # EFFICIENT REAL TIME CREDENTIALS FOR OCSP AND DISTRIBUTED OCSP

RELATED APPLICATIONS

This application is a continuation of U.S. application Ser. No. 11/703,176 filed May 4, 2015, which is a continuation of U.S. application Ser. No. 11/036,220 filed Jan. 10, 2005, which claims priority to U.S. Provisional Application No. 60/535,666 filed on Jan. 9, 2004, and on U.S. Provisional Application No. 60/536,817 filed on Jan. 15, 2004, which are incorporated by reference herein.

BACKGROUND OF THE INVENTION

1. Technical Field

This application relates to the field of digital certificates, and more particularly to the field of verifying and validating digital certificates and other information.

2. Description of Related Art

Digital signatures provide an effective form of Internet authentication. Unlike traditional passwords and PINs, digital signatures authenticate transactions in a way that is universally verifiable. Thus, it is very difficult, if not impossible, to repudiate a transaction that has been digitally signed. Digital signatures are produced via a signing key, SK, and verified via a matching verification key, PK. A user U keeps his own SK secret so that only U can sign on U's behalf. Fortunately, key PK does not "betray" the matching key SK; that is, knowledge of PK does not provide any practical advantage in computing SK. Therefore, a user U may make his own PK as public as possible so that every one can verify U's signatures. For this reason PK may be called the public key.

Digital certificates are alphanumeric strings that enable digital signatures by providing a guarantee that a given key PK is indeed the public key of a user U. A Certification Authority (CA) generates and issues a certificate to a user, but often only after being assured of the user's identity. Thus, the certificate proves that the CA has verified the holder's identity, and possibly other attributes. Certificates expire after a specified amount of time, often one year in the case of public CAs.

In essence, a digital certificate C consists of a CA's digital signature securely binding together several quantities: SN, a serial number unique to the certificate, PK, the public key of the user, U, the user's name, $D_1$, the issue date, $D_2$, the expiration date, and additional data. In symbols:

$$C = SIG_{CA}(SN, PK, U, D_1, D_2, \ldots )$$

It is useful to be able to determine the status of a digital certificate, including determining whether a particular certificate was validly issued and/or whether the certificate has been revoked prior to the expiration thereof. There are a number of techniques for determining the status of an individual digital certificate. For example, U.S. Pat. Nos. 5,666,416 and 5,717,758 describe techniques for providing individual certificate status. Other techniques for disseminating and ascertaining certificate status are also known, including Certificate Revocation Lists (CRL's), which are digitally-signed lists of revoked certificates and the Online Certificate Status Protocol (OCSP) which specifies a mechanism for querying about the status of a particular certificate.

CRL's work by having each CA periodically issue a properly dated and digitally signed list (the CRL) containing serial numbers of the revoked certificates. In some implementations, a CRL contains all revoked certificates of a given set of certificates. Thus, the digital certificate may be presented with an electronic transaction which is compared to the most recent CRL. If the given certificate is not expired but is on the list as having been revoked, then it is known from the CRL that the certificate is not valid and the certificate holder is no longer authorized to conduct the transaction enabled by the digital certificate. On the other hand, if the certificate does not appear in the CRL, then the certificate is deemed valid. Either way, the CRL may be archived with other records of each transaction, so as to be able to prove, in the future, the transaction's validity or, in the case of a revoked certificate, justify denial of service.

Assuming a revocation rate of ten percent, then, on average, one in ten digital certificates is revoked prior to the expiration thereof. According to such a revocation rate, a system having ten million certificates would generate a CRL containing one million serial numbers, which could make the CRL unwieldy. Though this problem can be lessened by more recently introduced CRL-partition techniques, the basic strategy of bundling together the revocation information of many certificates is still likely to generate inconvenience and cost. If serial numbers are twenty four bits long (to handle a few million certificates) a sub-CRL of one thousand certificates would still be twenty four thousand bits (three thousand bytes) long. In some deployments, a CRL entry for each certificate, with overhead, may be as large as twenty-two bytes, thus making a one thousand certificate sub-CRL twenty-two thousand bytes long. This may be unacceptable in certain situations such as, for example, a wireless transaction, where having to transmit this many bits (as protection against future disputes and potential legal claims) may be impractical.

CRL's may grow big because they provide proofs of revocation (and thus, indirectly, of validity) about many certificates lumped together. By contrast, OCSP may provide for proofs of validity of individual certificates. Conventional OCSP services use OCSP responders that may receive a question from a client (i.e., a relying party) about the validity of a given certificate issued by a given CA, and, in response thereto, may provide a digitally signed answer indicating both the status of the certificate and time information about the answer.

To be able to provide OCSP services, a conventional OCSP responder is provided with information about the status of all of a CA's certificates. Since often it is up to the CA to decide the status of its own certificates, then, if the OCSP responder is the CA itself, the OCSP responder/CA already has the information about the revocation status of the certificates. If, on the other hand, the OCSP responder is not the CA, the OCSP responder may be kept updated about the status of the CA's certificates. See, for example, U.S. Pat. No. 5,717,758, Witness-Based Certificate Revocation System.

The CA may update an OCSP responder by sending a most recent CRL. The OCSP responder may consult the CRL to deduce whether a particular certificate of interest is currently valid or revoked so that the OCSP responder may provide a signed response to a relying party indicating the time of the current CRL, the time of the next update, and the time of actual processing.

Of course, a malicious/compromised OCSP responder may provide arbitrary signed answers about the certificates of a given CA, with or without consulting any CRL's. Accordingly, for the relying party to securely rely on the digitally signed answer of an OCSP responder about the certificates of a given CA, the OCSP includes a mechanism where the CA provides the OCSP responder with a responder certificate, a special digital certificate—signed by the CA—that essentially vouches to other parties that the CA trusts the OCSP responder to provide accurate proofs about the CA's certificates. Note that for this process to work appropriately, each OCSP responder (as well as every CA) must have a secret signing key, and this key must be protected (e.g., by placing the server implementing the responder in a vault).

Referring to FIG. 1, a diagram 40 illustrates a flow of information in a traditional OCSP environment. The diagram 40 includes a CA 42, a conventional OCSP responder 44, and a relying party 46. The bold lines used for the CA 42 and the OCSP responder 44 indicate the presence of a secret key that must be protected for the system to work reliably. The CA 42 provides validity information 48 (e.g., a CRL) to the OCSP responder 44. The relying party 46 provides an OCSP request 52 to the OCSP responder 44. The OCSP responder 44 examines the validity information provided by the CA 42 (e.g., in the form of a CRL) and to determine the validity status of the certificate in question. The OCSP responder 44 then prepares a corresponding response, digitally signs the response and provides the result thereof as an OCSP response 54 to the relying party 46. In some cases, the OCSP responder 44 may also provide a responder certificate 56 to the relying party 46 indicating that the OCSP responder 44 is empowered and entrusted by the CA 42.

There are significant drawbacks to OCSP. In the first place, digital signatures are computationally intensive operations. The digital signature created by a conventional OCSP responder on each OCSP response is generated at the time of the request, and may be the most computationally intensive part of the validation operation. For example, generating a digital signature may add between fifty milliseconds and one second to transaction time. Even if a conventional OCSP responder caches a digital signature about a digital certificate C after being asked the first time about C and then sent the cached signature when asked about C afterwards, still the answer to the first user asking about C may be significantly delayed due to generation of the initial digital signature.

In addition, if there is a single OCSP responder, then all certificate-validity queries would, eventually, be routed to the single OCSP responder, which then may become a major network bottleneck and cause considerable congestion and delays. If huge numbers of honest users suddenly queried this OCSP responder, then a disrupting denial of service situation could ensue.

On the other hand, to prevent the bottleneck problems of centralized implementations of OCSP, an organization may consider distributing the request load (about the validity of its certificates) across several, properly certified, conventional OCSP responders. In general, distributing the load of a single server across several (e.g., one hundred) servers, strategically located around the world (to avoid transmission bottlenecks), could alleviate network congestion. However, for OCSP, load distribution may introduce additional problems because, in order to provide signed responses to the certificate-validity queries, each of the one hundred distributed conventional OCSP responders would have its own secret signing key. Thus, compromising any of the one hundred servers could effectively compromise the entire organization. Indeed, if a conventional OCSP responder were compromised, an attacker could use the discovered secret signing key to sign responses falsely indicating that (1) valid certificates are revoked, or (2) revoked certificates are still valid. This latter type of false-positive response could, for example, allow a terminated employee to regain access to systems.

One way to prevent a responder from being compromised is to run the responder from a secure vault, with 24×7 surveillance. Unfortunately, this is a costly option. A truly secure vault, meeting all the requirements of—say—a financial CA, may cost over one million dollars to build and one million dollars a year to operate. In addition, even if an organization were willing to pick up such expenses, vaults can not be built overnight. Thus if a CA needed a few more vaults to lessen the load of its current conventional OCSP responders, there may be a delay of months before new properly-vaulted OCSP responders could be constructed.

Moreover, incurring the costs of multiple vaults may not solve the OCSP security problems. This is because the OCSP mechanism requires that a conventional OCSP responder receive requests coming from un-trusted sources (the relying parties) and then service the requests using the secret signing key of the responder. A malicious relying party (or a malicious agent posing as a relying party) might thus prefer exposing the OCSP responder signing key by exploiting a possible weakness in the underlying operating system.

Furthermore, there are difficulties associated with OCSP with respect to servicing certificate validity requests originating from different security domains. For instance, conventional OCSP responders run by organization A may easily provide responses about the status of certificates of the CA of organization A, but OCSP responders run by another organization may not have enough information to provide responses about "foreign" certificates.

This problem, deriving from lack of specific knowledge, could be addressed in one of two ways. First, the relying parties from organization B could obtain from the responders from organization A the status of certificates from the CA of organization A. This limits performance however, since the OCSP responders from organization A may be geographically distant from relying parties of organization B, so network times may greatly slow overall validation processing. A second alternative is to allow responders from organization B to make responses about certificates from organization A, by having the CA from organization A forward CRLs from organization A to foreign responders. Indeed, CRLs are digitally signed and thus need not be kept secret, and the CA from organization A presumably wishes to inform the largest possible audience about the validity status of certificates from organization A. This second alternative provides an OCSP responder of organization B sufficient information for answering a request from a relying party about a certificate of organization A. But for the relying party to take seriously the digitally signed answer of an OCSP responder of organization B, the CA from organization A should also certify the foreign responder as trustworthy for answering validity queries about certificates from organization A.

Referring to FIG. 2, a diagram 60 illustrates the CA 42, the conventional OCSP responder 44, and the relying party 46 shown in the diagram 40 of FIG. 1. However, in the situation illustrated by the diagram 60, the relying party 46 provides an OCSP request 62 about a certificate that is not managed by the CA 42 but, instead, was issued and is managed by a different CA 64. In such a case, the OCSP responder 44 may not provide an OCSP response based solely on information within the CRL 48 provided by the CA 42 to the OCSP responder 44. Instead, the CA 64 provides a different CRL 66 and a different responder certificate 68 to the OCSP responder 44. The OCSP responder 44 may then use the different CRL 66 to formulate an OCSP response 72 about the foreign certificate. In some cases, the OCSP responder 44 may also provide to the relying party 46 the responder certificate 68.

This second alternative may provide better scalability and performance, but it muddies the security and trust flow between the two organizations. In the diagram 60, the OCSP responder 44 is making an authoritative response to the relying party that a certificate of the CA 64 is still good. If the OCSP responder 44 makes an incorrect response for any reason (misconfiguration, hostile attack, or straightforward dishonesty), the OCSP responder 44 may thus negatively impact the organization of the CA 64. By allowing the OCSP responder 44 to make authoritative claims about certificates of the organization of the CA 64, the organization of the CA 64 is relinquishing some of the trust that it previously held.

As an example, consider the case where the organizations are credit card issuers. A bank from organization A revokes the certificate for a user, and the bank pays to ensure that conventional OCSP responders from organization A are secure and reliable. Assume that the OCSP responders from organization B are misconfigured, so when a merchant relying party from organization B asks about the validity of the user, the responders of organization B incorrectly respond that the user is valid. The merchant accepts this answer and allows a transaction to proceed for the revoked user. This type of delegation-of-trust between organizations may be acceptable in some cases, but it is not a generally useful alternative for any large-scale heterogeneous deployment of traditional OCSP.

It is desirable to provide a system that addresses the difficulties discussed above.

SUMMARY OF THE INVENTION

According to the present invention, providing information about digital certificate validity includes ascertaining digital certificate validity status for each of a plurality of digital certificates in a set of digital certificates, generating a plurality of artificially pre-computed messages about the validity status of at least a subset of the set of digital certificate of the plurality of digital certificates, where at least one of the messages indicates validity status of more than one digital certificate and digitally signing the artificially pre-computed messages to provide OCSP format responses that respond to OCSP queries about specific digital certificates in the set of digital certificates, where at least one digital signature is used in connection with an OCSP format response for more than one digital certificate. Generating and digitally signing may occur prior to any OCSP queries that are answered by any of the OCSP format responses. Ascertaining digital certificate validity status may include obtaining authenticated information about digital certificates. The authenticated information about digital certificates may be generated by an entity that also revokes certificates. The authenticated information about digital certificates may be a CRL. Generating a plurality of artificially pre-computed responses may include generating responses for at least all non-revoked digital certificates in the set of digital certificates. Providing information about digital certificate validity may also include, after digitally signing the artificially pre-computed messages, forwarding the result thereof to a plurality of responders that service requests by relying parties inquiring about the validity status of digital certificates in the set of digital certificates. Providing information about digital certificate validity may also include, making available to the responders a special digital certificate containing a public verification key used to verify the digital signatures provided in connection with digitally signing the artificially pre-computed responses. An entity that issues the special digital certificate may also issue certificates of the set of digital certificates. Generating a plurality of artificially pre-computed responses and digitally signing the artificially pre-computed responses may be performed periodically. The artificially pre-computed responses may include time information corresponding to when the artificially pre-computed responses were generated.

According further to the present invention, computer software, stored in a computer readable medium, that provides information about digital certificate validity includes executable code that ascertains digital certificate validity status for each of a plurality of digital certificates in a set of digital certificates, executable code that generates a plurality of artificially pre-computed messages about the validity status of at least a subset of the set of digital certificate of the plurality of digital certificates, where at least one of the messages indicates validity status of more than one digital certificate, and executable code that digitally signs the artificially pre-computed messages to provide OCSP format responses that respond to OCSP queries about specific digital certificates in the set of digital certificates, where at least one digital signature is used in connection with an OCSP format response for more than one digital certificate. Executable code that ascertains digital certificate validity status may include executable code that obtains authenticated information about digital certificates. The authenticated information about digital certificates may be generated by an entity that also revokes certificates. The authenticated information about digital certificates may be a CRL. Executable code that generates a plurality of artificially pre-computed responses may include executable code that generates responses for at least all non-revoked digital certificates in the set of digital certificates. The computer software may also include executable code that forwards digitally signed the artificially pre-computed messages to a plurality of responders that service requests by relying parties inquiring about the validity status of digital certificates in the set of digital certificates. The computer software may also include executable code that makes available to the responders a special digital certificate containing a public verification key used to verify the digital signatures provided in connection with digitally signing the artificially pre-computed responses. An entity that issues the special digital certificate may also issue certificates of the set of digital certificates. Executable code that generates a plurality of artificially pre-computed responses and digitally signs the artificially pre-computed responses may generate and sign the responses periodically.

According further to the present invention, providing information about digital certificate validity includes obtaining a plurality of signing key/verification key pairs, where each signing key provides a digital signature and a corresponding one of the verification keys verifies the digital signature and where digitally signing together a plurality of data elements using the signing keys is computationally more efficient than digitally signing each of the data elements individually, ascertaining digital certificate validity status for each certificate in a set of digital certificates, generating a plurality of artificially pre-computed messages about the validity status of at least a subset of the set of digital certificates, and digitally signing together the artificially pre-computed messages using signing keys from the pairs. Ascertaining digital certificate validity status may include obtaining authenticated information about digital certificates. The authenticated information about digital certificates may be generated by an entity that also revokes certificates. The authenticated information about digital certificates may be a CRL. The artificially pre-computed responses may be OCSP format responses. Generating a plurality of artificially pre-computed responses may include generating responses for at least all non-revoked digital certificates in the set of digital certificates. Providing information about digital certificate validity may include, after digitally signing the artificially pre-computed messages, forwarding the result thereof to a plurality of responders that service requests by relying parties inquiring about the validity status of digital certificates in the set of digital certificates. Generating a plurality of artificially pre-computed responses and digitally signing the artificially pre-computed responses may be performed periodically. The artificially pre-computed responses may include time information corresponding to when the artificially pre-computed responses were generated. Providing information about digital certificate validity may include authenticating the verification keys. Authenticating the verification keys may include providing the verification in a single digital certificate. Authenticating the verification keys may include providing each of the verification keys in a separate digital certificate.

According further to the present invention, computer software, stored in a computer readable medium, that provides information about digital certificate validity includes executable code that obtains a plurality of signing key/verification key pairs, where each signing key provides a digital signature and a corresponding one of the verification keys verifies the digital signature and where digitally signing together a plurality of data elements using the signing keys is computationally more efficient than digitally signing each of the data elements individually, executable code that ascertains digital certificate validity status for each certificate in a set of digital certificates, executable code that generates a plurality of artificially pre-computed messages about the validity status of at least a subset of the set of digital certificates, and executable code that digitally signs together the artificially pre-computed messages using signing keys from the pairs. Executable code that ascertains digital certificate validity status may include executable code that obtains authenticated information about digital certificates. The authenticated information about digital certificates may be generated by an entity that also revokes certificates. The authenticated information about digital certificates may be a CRL. The artificially pre-computed responses may be OCSP format responses. Executable code that generates a plurality of artificially pre-computed responses may include executable code that generates responses for at least all non-revoked digital certificates in the set of digital certificates. The computer software may include executable code that authenticates the verification keys. Executable code that authenticates the verification keys may provide the verification in a single digital certificate or may provide each of the verification keys in a separate digital certificate.

According further to the present invention, facilitating a transaction between a first party and a second party includes, prior to initiating the transaction, one of the parties obtaining an artificially pre-computed OCSP response about a specific digital certificate, where the artificially pre-computed OCSP response is generated by an entity other than the first party and the second party, one of the parties initiating the transaction, in connection with the transaction, the first party providing the specific digital certificate to the second party, and the second party verifying the specific digital certificate using the artificially pre-computed OCSP response. The second party may obtain the artificially pre-computed OCSP response prior to the transaction being initiated. The second party may cache the artificially pre-computed OCSP response for future transactions. The first party may obtain the artificially pre-computed OCSP response prior to the transaction being initiated. The first party may cache the artificially pre-computed OCSP response for future transactions. Facilitating a transaction between a first party and a second party may also include the first party providing the artificially pre-computed OCSP response to the second party after the transaction being initiated.

According further to the present invention, ascertaining validity of a digital certificate includes examining a digitally signed message about the validity of the digital certificate, where the message is digitally signed by a special entity different from an entity that issued the digital certificate and verifying the digitally signed message using information from at least one of: the digital certificate and a certificate authenticating the entity that issued the digital certificate. The information may be a public key corresponding to a secret key used to digitally sign the message. The information may correspond to a special digital certificate authenticating the special entity that digitally signed the message.

According further to the present invention, ascertaining digital certificate validity status for each certificate in a set of digital certificates includes periodically generating a plurality of digitally signed artificially pre-computed messages about the validity status of at least a subset of the set of digital certificates, and periodically forwarding the digitally signed artificially pre-computed messages to a plurality of responders that service requests by relying parties inquiring about the validity status of digital certificates in the set of digital certificates, where messages about some certificates are forwarded at a different frequency than messages about other certificates. Messages about revoked certificates may be forwarded less frequently than messages about valid certificates.

According further to the present invention, computer software, stored in a computer readable medium, that ascertains validity of a digital certificate, includes executable code that examines a digitally signed message about the validity of the digital certificate, where the message is digitally signed by a special entity different from an entity that issued the digital certificate and executable code that verifies the digitally signed message using information from at least one of: the digital certificate and a certificate authenticating the entity that issued the digital certificate. The information may be a public key corresponding to a secret key used to digitally sign the message. The information may correspond to a special digital certificate authenticating the special entity that digitally signed the message.

According further to the present invention, computer software, stored in a computer readable medium, that provides information about digital certificate validity includes executable code that ascertains digital certificate validity status for each certificate in a set of digital certificates, executable code that periodically generates a plurality of digitally signed artificially pre-computed messages about the validity status of at least a subset of the set of digital certificates, and executable code that periodically forwards the digitally signed artificially pre-computed messages to a plurality of responders that service requests by relying parties inquiring about the validity status of digital certificates in the set of digital certificates, where messages about some certificates are forwarded at a different frequency than messages about other certificates. Messages about revoked certificates may be forwarded less frequently than messages about valid certificates.

The system described herein is a cost-effective, secure, scalable, and overall efficient credential/privilege validation system, that significantly enhances conventional OCSP-like method. The system described herein, even when exercising the option of maintaining compatibility with the OCSP standards, provide significant advantages over conventional OCSP, so as to offer qualitatively superior security and scalability.

The system described herein is a general, stand-alone system working independent of conventional OCSP. In some embodiments, however, the system may be OCSP compliant where each proof of validity according to the system described herein is structured as a syntactically correct digitally signed OCSP response so that a relying party requests and then verifies certificate validity information according to OCSP formats, etc. Digital signatures are computationally intensive operations, but the system described herein concentrates this difficulty on a single dedicated server or, in other embodiments, a small number of dedicated servers. It is therefore very easy and relatively inexpensive to equip the single dedicated server (or small number of servers) with a computer sufficiently powerful to handle all required digital signatures at each update. The responders used in the system described herein need only perform trivial fetch-and-forward operations, and thus may service an incoming relying-party query much faster than conventional OCSP responders could, since the latter must perform complex digital signatures.

Because the responders for the system described herein may employ trivial hardware and do not need to be secure, the responders may be relatively inexpensive to buy and to operate. Consequently, a relatively large number of responders may be deployed at a relatively low expense. Therefore, even if a large number of certificate validity status requests are generated in a short amount of time, this load may be spread across many responders, eliminating the risk of congestion and benign denial of service without incurring much cost. Note that the number of digital signatures for the system described herein depends on the number of certificates and is relatively independent of the number of validity-status requests. Thus a single server providing digitally signed responses may be used even if a relatively large number of validity requested are expected.

In the system described herein, only the single dedicated server (or small number of dedicated servers), and the CA (if different from the single dedicated server) need to be protected/vaulted. In fact, the responders of the system described herein do not store any secret keys: they only store the digital signatures of the pre-computed responses provided to the responders which, once computed, can not be maliciously altered and thus need not be kept secret. By contrast, all conventional OCSP responders need protections, because each of the conventional OCSP responders has a secret signing key, the divulgation of which compromises the entire system. Therefore, the system described herein is more secure than OCSP, because defending a single site (or a small number of sites) is preferable and easier than defending many and equally important sites.

Moreover, unlike with OCSP, relying parties can not easily mount software attacks on the system described herein. Even if a relying party succeeds in embedding in its query some kind of Trojan horse, it would not be able to expose any secrets, because the responders of the system described herein hold no secrets: the responders only store and return pre-computed digital signatures provided to the responders. Thus, all a malicious relying party may hope to expose is the full, accurate, and digitally signed account of which certificates are valid and which are revoked in a given time interval. However, this not only is non-secret information, and, in fact, is information that the CA would like to be universally known to prevent a relying party from incorrectly on revoked certificates issued by the CA.

In addition, note that software attacks may not be easily mounted against the single dedicated server (or small number of dedicated servers) that digitally sign the pre-computed responses. In some embodiments, the single dedicated server (or small number of dedicated servers) does not process requests of untrusted sources, but rather, only receive information from the CA and provide digitally signed information to the responders. Therefore the ability to inject a Trojan horse is not necessarily available in the system described herein.

In addition to these advantages, the system described herein enables significant flexibility within heterogeneous deployments involving multiple organizations. A responder from one organization can forward artificially pre-computed responses to another organization without needing to distribute any trust to the other organization. A first organization may enable the responders of another organization to provide convincing proofs of validity for the first organization without relinquishing any amount of control over the validity status of certificates of the first organization. That is, in the system described herein, trust may flow from one organization to another without any loss of security or control In some embodiments, the responders may be treated as transparent network infrastructure rather than hardened trust points. This is similar to the service cloud offered by the Internet's DNS infrastructure, in that it allows for a heterogeneous collection of name servers that transparently interoperate to discover and cache valid responses for queries.

Secure heterogeneity is a major advantage of the system described herein over conventional OCSP. Secure heterogeneity allows a wide variety of organizations to interoperate so that relying parties from different organizations can cross-validate certificates from other organizations in a secure, reliable, efficient manner.

The system described herein provides all validation trust into a single authority (or small number of authorities) while distributing the query load across an arbitrary number of unprotected responders. The system described herein does not decrease security even in distributed implementations relying on a relatively large number of responders even though the responders are unprotected. The system described herein improves the response time to a query. The system described herein does not delegate trust to foreign responders in heterogeneous environments.

DETAILED DESCRIPTION OF VARIOUS EMBODIMENTS

Figure 1:
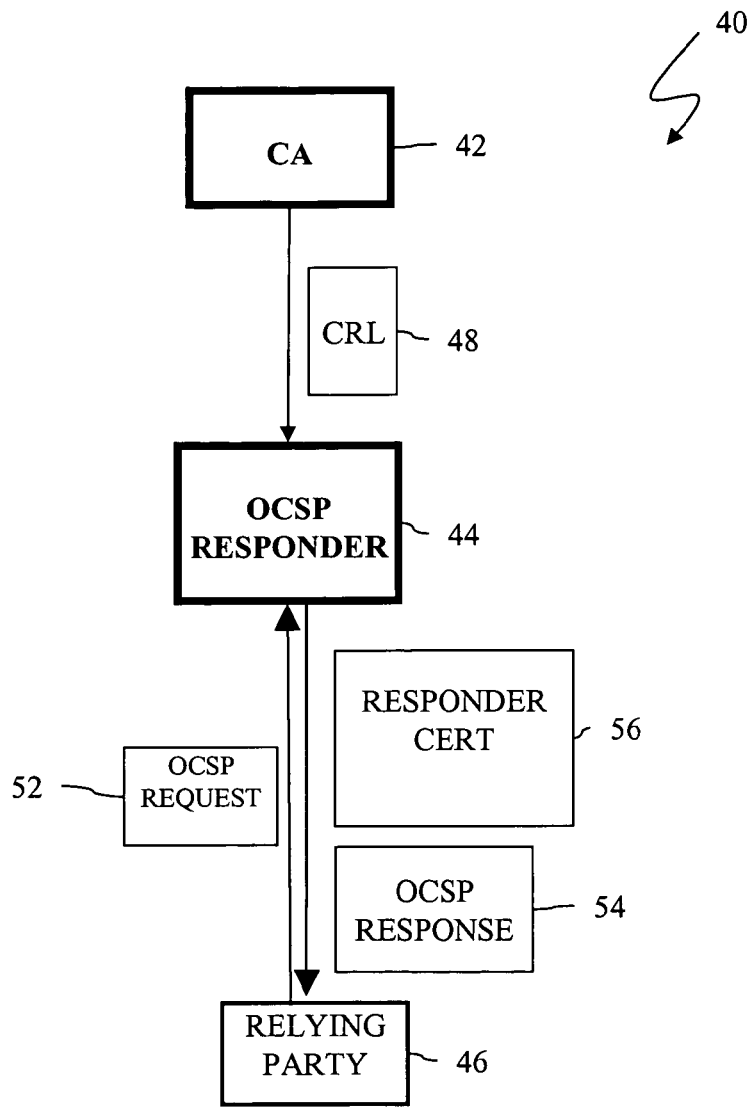
FIG. 1 illustrates a prior art system for providing OCSP responses to a relying party.
Figure 2:
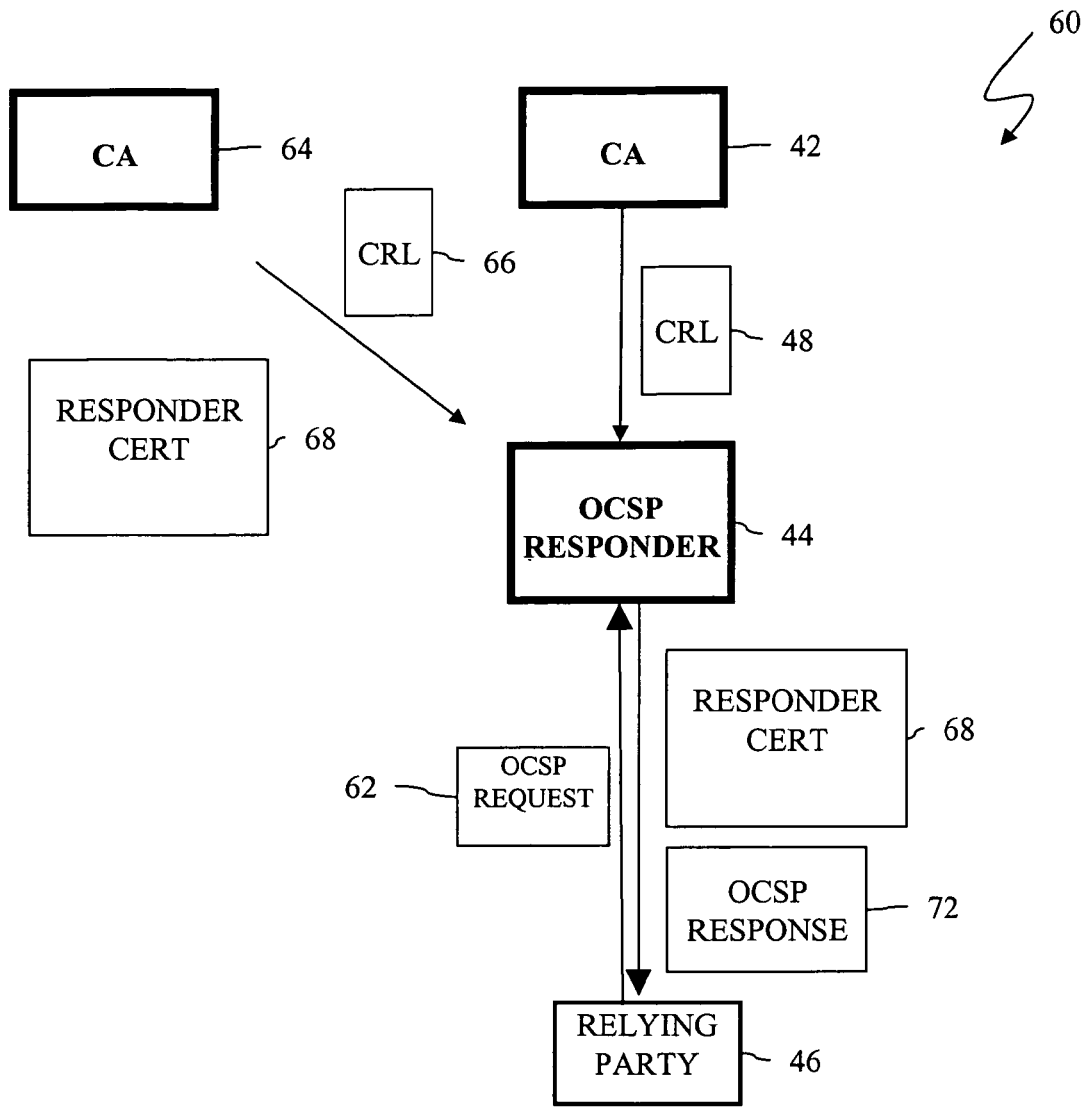
FIG. 2 illustrates a prior art system for providing OCSP responses in a heterogeneous environments.

The system described herein uses Real Time Credentials (RTC), alternatively referred to as Distributed OCSP (DOCSP), and uses an entity referred to as an RTC Authority (RTCA). The RTCA may or may not coincide with the CA of a given enterprise. In some embodiments, each CA provides its own RTCA with a special certificate, the RTCA certificate. The CA may digitally sign the RTCA certificate, indicating that the CA trusts and empowers the RTCA to provide certificate validity information about certificates issued by the CA. The RTCA certificate may convey RTCA status to a given entity (e.g., identified by a given identifier, OID number, etc.) and may bind a given verification key PK (for which the given entity possesses a corresponding secret signing key) to the given entity.

In instances where the CA and the RTCA coincide, it may be advantageous for the RTCA to have a different signing key than the CA. Thus, if the CA and the RTCA are the same entity, the CA component of the entity may essentially only issue certificates while the RTCA component of the entity may only manage the certificates by, for example, proving that particular certificates are valid or revoked. Thus, even if the CA and the RTCA coincided, an RTCA certificate might still be used.

In some embodiments, each CA is associated with only one RTCA. In other embodiments, it is possible for each CA to be associated with more than one RTCA, where each RTCA has a different signing key or where some or all of the RTCA's share signing keys. Having multiple RTCA's associated with a CA may be advantageous for redundancy purposes. In other embodiments, it is possible to have one or more RTCA's be associated with multiple CA's.

Just as the CA protects its signing key, the RTCA protects its signing key, for instance, by means of a vault, secure facility, or secure hardware. In some embodiments, the RTCA may be hosted in a protected facility that includes more than one server having a secret signing key. The facility may securely store copies of secret signing keys. The RTCA may include more than one server each having a secret signing key properly certified by the CA.

The CA may keep the RTCA apprised of the validity status of certificates of the CA using, for example, CRL's, or using any other appropriate mechanism. The CA may (1) inform the RTCA of any change in certificate validity in an on-line fashion, as soon as a change occurs, and/or (2) send the RTCA a CRL at fixed time intervals and/or whenever the CA produces a new CRL. The CA may use any one or more (alone or in combination) of a number of techniques for providing individual certificate status information. See, for example, the disclosure provided in U.S. Pat. Nos. 5,420,927; 5,604,804; 5,610,982; 6,097,811; 6,301,659; 5,793,868; 5,717,758; 5,717,757; 6,487,658; and 5,717,759, all of which are incorporated by reference herein. The system described herein may use techniques disclosed in one or more of these patents, possibly in combination with one or more other appropriate techniques. Techniques that may be used include, alone or in any combination, full CRL's, partitioned CRL's, delta CRL's, OCSP responses (individually and in groups), mini CRL's (bitwise compressed CRL's), VTokens (one-way hash chain), and various Merkle tree or other tree incarnations.

At any date Di of a sequence of dates, D1, D2, . . . , the RTCA, based on its current knowledge of validity status (e.g., based on the latest CRL of the CA) and independent of any relying-party request, may perform an update by processing each outstanding certificate of the CA, and digitally signing a declaration stating the status of each certificate. The status of each certificate may be deemed, for example, valid, revoked, or suspended (as well as possibly "unknown"). The signed declaration may specify a time interval T. In some embodiments, at each update, every signed declaration specifies the same time interval T, and, in some embodiments, the totality of the time intervals is contiguous. For instance, at each update date Di, the time interval may be T=Di+1−Di—where possibly only one of Di and Di+1 is part of T, while the other date is part of an adjacent time interval. In some embodiments, if the RTCA's current knowledge about certificate status is based on CRL's, then each Di may coincide with the date of one CRL, and Di+1 with the date of the next CRL and so forth. It should be appreciated, though, that such strict time dependency is not necessary. For instance, the dates at which the RTCA processes or starts processing its declarations may be D1, D2, etc., while the time intervals specified within the declarations may be D1', D2', etc., where Di and Di' may be different and/or independent. For instance, Di may be earlier than Di', in which case the RTCA may start processing a declarations before the beginning of the declaration's time interval—e.g., because the RTCA wishes to finish its processing by the beginning of interval T.

In some embodiments, if CRL's are used for RTCA updates from the CA, declaration times and CRL times may be different too. The possible lack of synchronizations among processing times, CRL times and declaration times is not crucial to the system described herein. In practice, "real time" is an abstraction, because some additional time is needed to notice and properly react to events. To begin with, note that CRL's, though driving the RTCA process, may not be produced in real time. Moreover, the process of revoking a certificate may not be real time either. For instance, a user may realize that his secret key has been compromised—and thus request that his own certificate be revoked—only one day after the compromise actually occurred. Thus, the user's certificate may be revoked with a one-day delay anyway which, in comparison the deviation from real time due to RTCA computation, may be negligible.

The RTCA pre-computes a digital signature indicating the status of each certificate for a given time interval T. Such pre-computation may be performed independent of any party's request about a certificate validity. In some embodiments, the RTCA may pre-compute a signed declaration of the status of certificate C in a given time interval before any status query about C is ever made and, perhaps, even before the time interval starts.

In some embodiments, the RTCA-signed declarations of certificate status may be in standard OCSP format. This is useful in situations where OCSP software is already in place so that it is convenient to take advantage of the RTC system without having to modify any of the existing relying-party OCSP software. In some embodiments, OCSP compliance is provided by specifically choosing relevant quantities, digital signature algorithms, OIDs, etc.

In many cases, the RTCA may need to generate responses for every issued certificate, rather than just for revoked certificates. To determine the existence of each issued certificate serial number, the RTCA may be given, by the CA or another entity, a copy of every certificate for internal tracking, or the RTCA may be given the issued serial numbers through another mechanism that does not involve transmitting the individual certificates. In some embodiments, issued certificate information may not need to be explicitly provided to the RTCA in the special case where the serial numbers for certificates are issued in sequential order. When sequential serial numbers are used, the RTCA may choose to infer the existence of each certificate serial number using only the current CRL. This may be done by determining the lowest and highest serial numbers in the CRL. Any intermediate numbers in the range between the high and low serial number may be known to be issued by the CA. If a number in the range is present in the CRL, then the status is known to be revoked. If an intermediate number in the range is not present, then the corresponding certificate me be determined to be not revoked, which is defined as "valid" in the OCSP standard.

The technique described above may handle the vast majority of issued certificates, although there may still be a few certificates that are issued having serial numbers that are either lower than the lowest CRL entry or higher than the highest CRL entry. The RTCA may include these additional serial numbers through configurable parameters that assume a fixed number of valid serial numbers both before the first entry in the CRL and after the last entry in the CRL. For example, the RTCA may specify one hundred serial numbers before the lowest CRL entry and five hundred serial numbers after the highest CRL entry as representing valid certificates. This optimization allows the RTCA to retrieve one data element (the CRL) instead of a large number of elements (the individual certificates). The higher number used at the high end may be useful for accommodating newly issued certificates in situations where a certificates are issued with sequential serial numbers from low to high. In other embodiments, the lowest and highest serial numbers for issued certificates may be explicitly provided to the RTCA and, in some embodiments, that information may be digitally signed.

Note that the pre-computed syntactically correct OCSP responses may technically be deemed not to be OCSP responses because the responses are not computed in response to any original/initial request. In essence, the RTCA pre-computes OCSP-compliant responses to OCSP requests that have not yet been generated, and may never be generated. Thus, the RTCA responses as may be deemed artificially pre-computed responses. It is also possible to use the term artificially pre-computed responses to denote any digitally signed RTCA declarations, even in implementations that are not OCSP compliant.

After generating the artificially pre-computed responses, the RTCA may make the responses available to other parties. In particular, the RTCA may return a response to a relying party in response to a validity status query. In other embodiments, however, the RTCA may make the artificially pre-computed responses available to RTC responders. The RTC responders need not be protected since the RTCA-signed messages (artificially pre-computed responses) may not in practice be fraudulently modified or altered in a non-detectable way. Thus, the RTCA may send artificially pre-computed responses to foreign responders (responders belonging to other organizations) without jeopardizing security.

In some embodiments, the RTCA may facilitate processing by the RTC responders by presenting the artificially pre-computed responses to the RTC responders in a suitably organized fashion. For instance, the RTCA may present the artificially pre-computed responses ordered according to certificate serial number, or according to length, etc. To ensure that all the relevant artificially pre-computed responses have been received, at every update, the RTCA may provide RTC responders with an additional signature, by signing and dating the totality of the artificial, pre-computed responses. In some embodiments, checksums, a count of the number of artificially pre-computed responses, or similar mechanism may be used, with or without digital signatures.

In addition, the RTCA may send to the RTC responders the RTCA certificate generated by the CA to prove that the CA trusts and empowers the RTCA to provide certificate validity information about certificates issued by the CA. In some embodiments, it is not necessary to do this at every update. In some instances, the RTCA sends to the RTC responders the RTCA certificate only initially or at some fixed period or upon request.

The RTC responders may store the received artificially pre-computed responses of the RTCA for a sufficient time. In some embodiments, if the signatures of the RTCA relate to a given time interval T, the RTC responders may store the artificially pre-computed responses at least until the end of T. In some embodiments, at least some of the RTC responders, such as those belonging to the same organization as the RTCA, may periodically take steps to ensure that information is correct and up-to-date. For instance, an RTC responder may verify that the artificially pre-computed responses about a time interval T are received by the beginning of T or other suitable time related to T, verify all received RTCA signatures (and possibly also the proper RTCA certificate), verify whether the RTC responder has received all signatures (e.g., no less than the expected number of signatures, no fewer signatures than of last transmission for already issued certificates, etc.), verify whether the RTC responder has received information indicating validity for a certificate that was previously declared revoked, verify that the RTCA certificate itself has not been revoked (e.g., because of a security compromise), etc. If any problem is detected, the RTC responder may inform the RTCA or an other proper entity.

The relying parties may ask the RTC responders for the validity status of certificates. In some embodiments, the request is in the OCSP format. When asked about the validity of a given certificate, an RTC responder may fetch from memory, and return to the relying party, the RTCA-generated artificially pre-computed response for the particular certificate. In some embodiments, the RTC responder may also forward the certificate for the RTCA that signed the artificially pre-computed response. In some embodiments, the relying party may signal that it is not interested in receiving the RTCA certificate (because, for example, the relying party already has a copy), or the RTC responder may know or assume that the relying party has already a copy of the certificate. The relying party may process the received responses to ascertain the validity status of the certificate of interest. In some embodiments, if the artificially pre-computed response is in the OCSP format, the relying parties may use OCSP software for such processing. In some embodiments, the relying parties may verify the proper RTCA certificates. In the case of OCSP-compliant implementation, the relying parties may verify an RTCA certificate as an OCSP responder certificate. In some embodiments, an RTCA certificate may be syntactically constructed as an OCSP-responder certificate.

There are optimizations that may be performed. For example, let U be a party having a certificate Cu. As part of a transaction with a party V, U may send Cu to V (unless V already has Cu), and possibly perform additional tasks (such as exhibiting a digital signature relative to a public verification key certified in Cu to belong to U, or being identified by decrypting a random challenge encrypted by V using a public encryption key certified in Cu to belong to U). For the transaction to be secure, V might ascertain the current validity of Cu and make a validity query to an RTC responder. The responder may answer the query by fetching and returning the most current RTCA-signed declaration (artificially pre-computed response) about Cu. However, querying an RTC responder adds a third party to a transaction that would otherwise be a two party transaction, which increases the time and complexity of the transaction.

One solution is to have party U may, at the beginning of or at least during each time interval T, receive an RTCA-signed declaration Du (an artificially pre-computed response) that Cu is valid throughout T. U can receive Du in response to a request to the RTC responder (e.g., by making a ordinary relying-party request). Alternatively, Du may be pushed to U, and possibly others, by, for example, an RTC responder or by an RTCA at every update and/or on an automatic basis. In any case, in connection with transacting with V during interval T, U may forward Du to V in addition to all other steps or tasks the transaction entails. Therefore, the U-V transaction may be significantly sped up since V needs not call on any third party (e.g., the RTC responder) in order to ascertain the current validity of U's certificate.

Note that even though overall time, which includes U obtaining Du, may not be sped up, the U-V transaction may be. However, also note that speeding up only the U-V transaction without saving in overall time may still be useful and efficient. For example, if it is assumed that RTCA declarations (artificially pre-computed responses) are computed at midnight and specify an entire day as a time interval, then U may obtain Du early in the day (when there are relatively few transactions) and then forward Du to V during a time sensitive U-V transaction conducted when there are significantly more transactions and thus when saving time could be useful. Note also that further efficiency may be gained by having U, after obtaining and caching Du, forward Du throughout the day when transacting with other parties. This way, for instance, a single relying-party query (that of U itself, possibly made at a relatively unbusy time) may successfully replace a number of relying-party requests (possibly at a more busy time).

The optimization discussed above may also be achieved by the party V. After obtaining Du from an RTC responder in return to a query about the validity of a certificate Cu of party U, party V may give Du to U, or make Du available for others to use.

Note that the optimization discussed herein applies to embodiments using an OCSP-compliant implementation of the system described herein. Note that it is also possible to apply a similar optimization to conventional OCSP implementations. For such an implementation, a user requests and obtains an OCSP response about his own certificate, and then forwards this OCSP response as part of his transactions to the other parties of the transactions for the appropriate time interval. Alternatively, when asked for the first time by a relying party about the validity of a certificate Cu of party U, an OCSP responder may compute a response Ru, return Ru to the querying relying party, and also forward Ru to U, so that U can cache Ru and, at least for a while (until the next update), can forward Ru as part of transactions based on Cu.

In some embodiments, the system described herein may be implemented using data found in individual certificates, thereby saving additional certificates and/or response length. As discussed above, the CA may issue an RTCA certificate that empowers a given RTCA to provide authoritative answers about the validity of certificates issued by the CA. Such an RTCA certificate may specify the public key that is used for verifying RTCA-signed responses (artificially pre-computed responses). In some embodiments, however, the CA may embed the RTCA public key within certificates issued by the CA or the information may be embedded in the CA certificate itself. That is, the CA (with proper format, OID, etc.) may include in a certificate Cu the public key PK that may be used for verifying the digitally signed responses about Cu's validity. For these embodiments, a relying party need not receive a separate RTCA certificate. When asking an RTC responder for the latest proof of validity for Cu, a relying party may just obtain (e.g., because it so asks) the RTCA-signed response (artificially pre-computed response). In fact, a Cu may specify the public verification key that a relying party may use for verifying a proof of validity for Cu. In other embodiments, the entire RTCA certificate (or a pointer thereto) may be embedded in a user certificate and/or in the CA certificate. These embodiments may yield significant savings in transmission (since the RTC responder may not need to send a separate RTCA certificate, which may be much longer than an RTCA response) and in storage (since the relying party may not need to store the RTCA certificate alongside with the RTCA response, as protection against future claims for having relied on Cu).

Similarly, a certificate Cu may specify time intervals therefor. For these embodiments, an RTCA response may not need to specify both the beginning and end of an interval T. In some embodiments, the beginning of T alone (or other simpler specification) may appropriately specify T. For instance, if Cu specifies daily updates, then any time within a given day suffices to specify the entire day to which a response refers. Alternatively, if it is understood (e.g., from the CA's general policies) that the certificates have validity intervals consisting of a full day, then there is no need for such information to be specified within a certificate, and yet the savings in RTCA responses apply.

Note that, while an RTCA proof of validity or suspension for a given certificate C may specify a time interval to which the proof refers, a proof of revocation need not specify any time interval. Rather, it often suffices for such a proof to specify a single point in time (e.g., a time of revocation) since, unlike validity and suspension, revocation is often an irrevocable process. Thus, a single revocation time, rt, may suffice for proving a certificate revoked. Note that rt need not be the beginning of any time interval T, but could specify any time. Thus, in the case of a permanent revocation of a certificate C, the RTCA need not send C's revocation proof at all update dates (e.g., D1, D2, etc.). Instead, a revocation proof may be sent only once (or a few times for redundancy) and then cached by an RTC responder to be returned whenever a relying party query about C is made.

Note also that an RTCA may be informed immediately that a certificate C has been revoked. For example, information that C has been revoked may be forwarded in the middle of a time interval T for which the RTCA has already produced and forwarded a proof of validity for C to the RTC responders. In such a case, by the next update, no proof of validity will be computed for C. However, until then (i.e., until the end of T), an incorrect, but facially valid, proof of validity for C is held by the RTC responders. A possible counter-measure includes having proofs of revocation take precedence over proofs of validity. In such a case, an honest relying party that sees both a proof of validity for C for some time interval T and a proof of revocation for C (at whatever time t), should regard C as revoked (after time t).

In some situations, some relying parties may have never seen a proof of revocation, and thus C may considered by some still valid until the end of T even though C has been revoked. Such problems may be lessened by having the RTCA compute and send to all RTC responders a proof of C's revocation (independent of the scheduled dates D1, D2, etc. or D1', D2', etc.) as soon as the RTCA learns that C has been revoked (e.g., directly from the CA without waiting the next CRL update). All properly functioning RTC responders may then erase from memory any proof of C's validity and substitute therefor the newly received proof of revocation. In such a case the RTC responders are more likely to provide relying parties with accurate proofs about C's validity.

Figure 3:
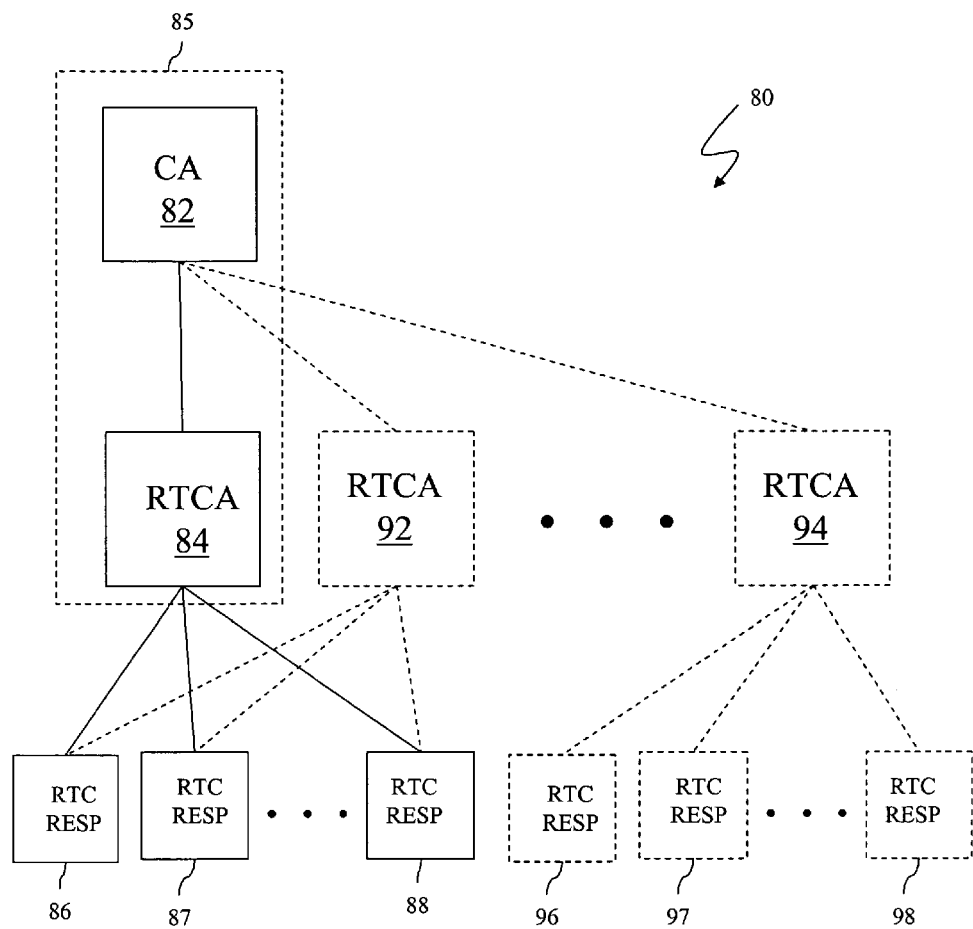
FIG. 3 illustrates an RTC system according to an embodiment of the system described herein.

Referring to FIG. 3, a diagram 80 illustrates an architecture for implementing the system described herein. A CA 82 is coupled to an RTCA 84 and provides validation information thereto (e.g., CRLs). The RTCA 84 is coupled to a plurality of RTC responders 86-88 which receive the artificially pre-computed responses from the RTCA 84. As discussed elsewhere herein, both the CA 82 and the RTCA 84 each use a secret signing key. In some embodiments, the CA 82 and the RTCA 84 may be the same entity, as illustrated by the box 85.

The RTCA 84 provides the artificially pre-computed responses to the RTC responders 86-88. As discussed elsewhere herein, the RTC responders 86-88 do not need their own secret signing key and do not need to be secured since any information provided by one of the RTC responders 86-88 to a relying party has been digitally signed by the RTCA 84 and is public information.

In other embodiments, more than one RTCA may be used, which is illustrated by an RTCA 92 and an RTCA 94 which represent a plurality of additional RTCAs. Each of the additional RTCAs 92, 94 may be coupled to the responders 86-88 that are served by the RTCA 84. Alternatively, one or more of the additional RTCAs 92, 94 may be coupled to an additional, different plurality of responders 96-98.

Figure 4:
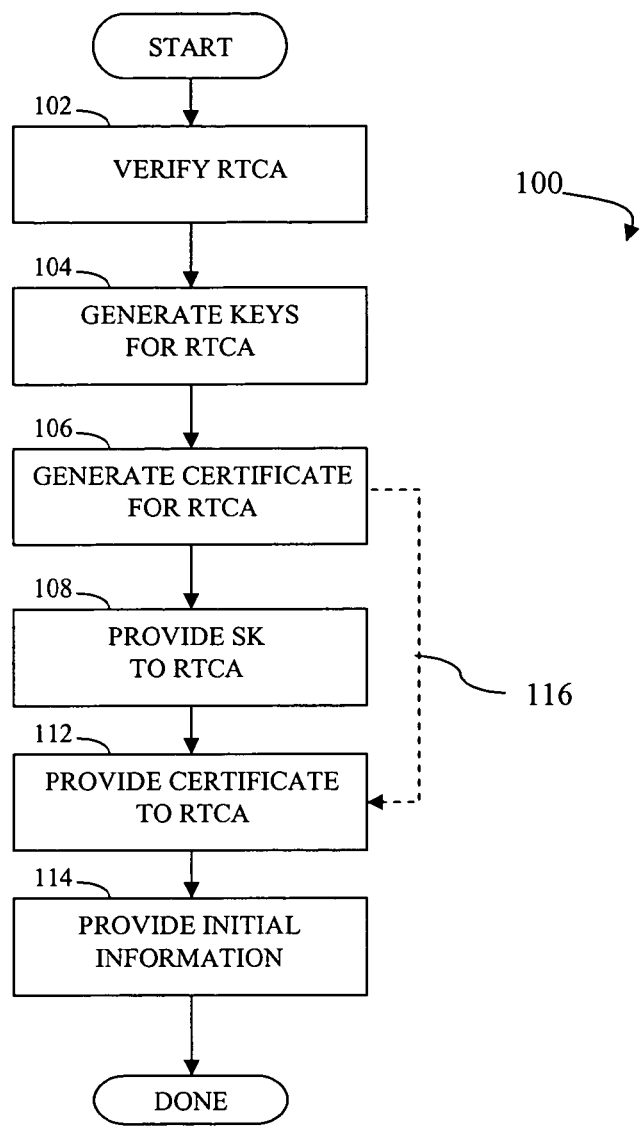
FIG. 4 is a flow chart illustrating initializing an RTCA according to an embodiment of the system described herein.

Referring to FIG. 4, a flow chart 100 illustrates steps performed by a CA in connection with initializing an RTCA. The steps of the flow chart 100 may be performed in connection with a new RTCA being added to a system or in connection with a previous RTCA being issued a new certificate, either because the old RTCA certificate had expired or because the security/secret key of the RTCA had been compromised.

Processing begins at a first step 102 where the CA verifies the RTCA. Verifying the RTCA at the step 102 depends upon the topology and security requirements of the system and may require, for example, an administrator physically inspecting the RTCA and verifying that the RTCA is in place and is secure. Of course, there may be other appropriate processing performed at the step 102 to verify that the RTCA is secure. Following the step 102 is a step 104 where the CA generates keys for the RTCA. At the step 104, the CA generates both a secret key for the RTCA and a public key for the RTCA.

Following the step 104 is a step 106 where the CA generates a certificate for the RTCA based on the keys generated at the step 104. The certificate generated at the step 106 is the RTCA certificate. Following the step 106 is a step 108 where the secret key is provided to the RTCA. In some embodiments, it may be useful for security purposes for the secret key to be provided to the RTCA in an off-line manner (e.g., by a user writing the secret key on a piece of paper and then physically entering the secret key at the RTCA).

Following the step 108 is a step 112 where the certificate generated at the step 106 is provided to the RTCA. At the step 112, it is possible to provide the certificate to the RTCA in an on-line (even unsecure) manner, since the RTCA certificate will be made public and, for all practical purposes, cannot be tampered with without knowledge of the secret key of the CA (usually different from the secret key generated at the step 104). Following the step 112 is a step 114 where the initial certificate data about the certificates managed by the CA is provided from the CA to the RTCA. The initial data provided at the step 114 may include an initial CRL. In addition, as described elsewhere herein, the initial data provided at the step 114 may also include information about valid, unexpired certificates so that the RTCA may provide appropriate responses for the valid unexpired certificates. Following the step 114, processing is complete.

In some embodiments, the step 104 is performed by the RTCA so that the RTCA is the only entity with knowledge of the secret key. In that case, the RTCA will present the corresponding public key to the CA (in either an on-line or off-line manner) so that the CA may generate the certificate at the step 106. Of course, in such a case, it is not necessary to perform the step 108, described above. This is illustrated by an alternative flow path 116 from the step 106 to the step 112 shown in the flow chart 100.

Note that the steps of the flow chart 100 may be performed even in instances where the CA and the RTCA are the same entity. Of course, in such a case, verifying the RTCA at the step 102 is trivial. In addition, for embodiments where the RTCA/CA will use the same public key and secret key pair for both the CA function and the RTCA function, the steps 104, 106, 108, and 112 need not be performed since the RTCA certificate will simply be the certificate of the CA. However, in instances where it is useful to have the RTCA certificate be in a different format than the CA certificate (e.g., OCSP responder certificate format), the step 106 may be performed in connection with generating the different format certificate for the RTCA certificate.

Figure 5:
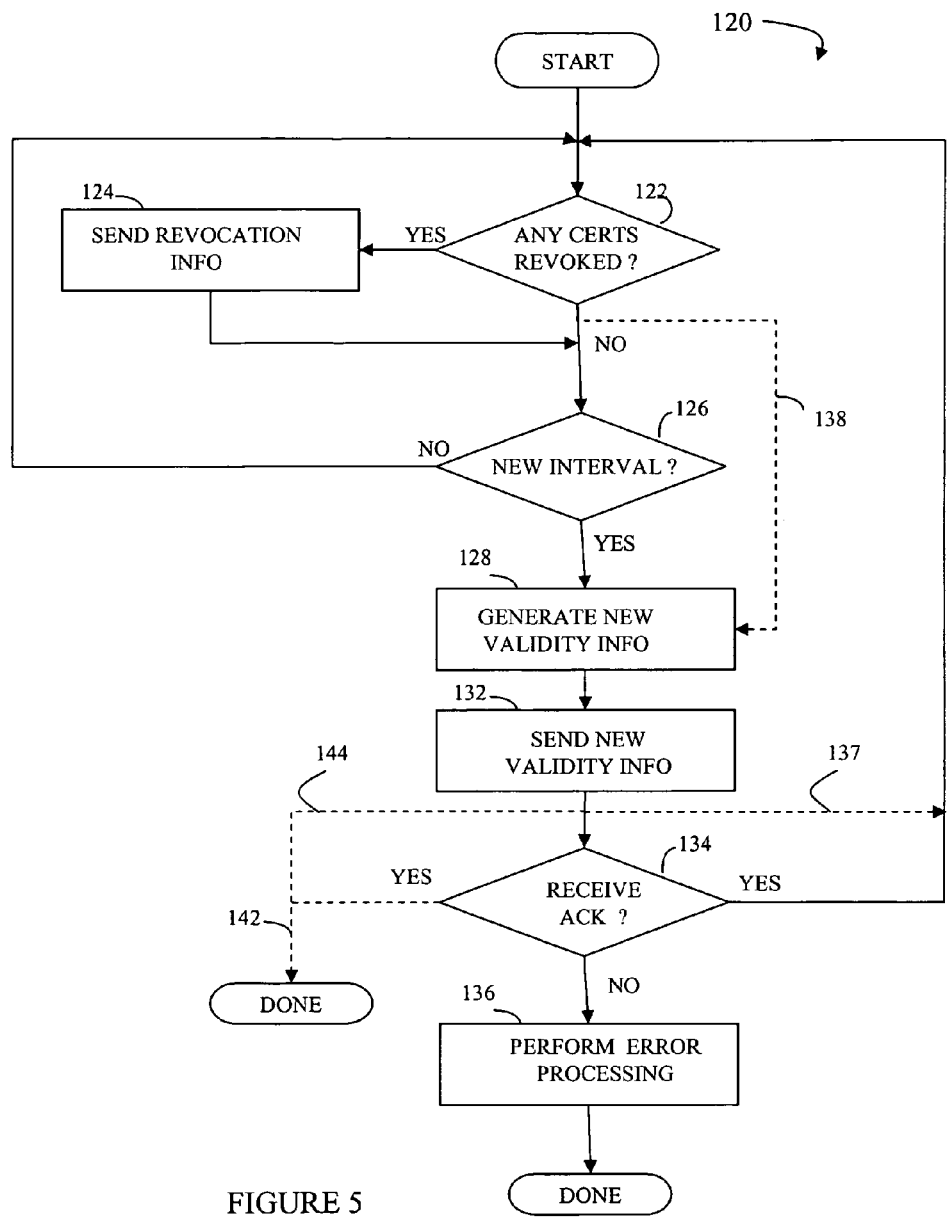
FIG. 5 is a flow chart illustrating communicating between a CA and an RTCA according to an embodiment of a system described herein.

Referring to FIG. 5, a flow chart 120 illustrates steps performed in connection with a periodic transfer of certificate validity data from the CA to the RTCA. The steps of the flow chart 120 may be performed either periodically or upon specific requests by an RTCA. Processing begins at a first test step 122 where it is determined if any certificates have been revoked recently (i.e., since the last iteration). If so, then control passes from the test step 122 to a step 124 where the revocation information is sent to the responder. As discussed elsewhere herein, in some embodiments, revocation information is sent immediately (or as near immediately as possible) from the CA to the RTCA. In some embodiments, the revocation information sent from the CA to the RTCA at the step 124 is digitally signed or otherwise authenticated.

Following the step 124 or following the test step 122 if no certificates have been recently revoked, is a test step 126 which determines if the current time corresponds to a new time interval for updating certificate information. As discussed elsewhere herein, in some embodiments, the CA pushes new validity information to the RTCA(s) at periodic intervals. Thus, if it is determined at the test step 126 that the current time does not correspond to a new interval, then control passes from the test step 126 back to the step 122, discussed above. Otherwise, if the current time does correspond to a new time interval, then control passes from the test step 126 to a step 128 where new validity information is generated by the CA, which includes, in some embodiments, digitally signing or otherwise authenticating the information. As discussed elsewhere herein, the new validity information can be in any one of a variety of forms, including CRL's.

Following the step 128 is a step 132 where the new validity information generated at the step 128 is provided to the RTCA. Following the step 132 is a test step 134 which determines if the RTCA has acknowledged receipt of the information sent at the step 132. If not, then control transfers from the step 134 to a step 136 where error processing is performed. The error processing performed at the step 136 may include, for example, notifying a system administrator. Note that it is useful to determine if the RTCA has received the new information at the step 134 since a malicious attacker could disable the RTCA as a means to prevent promulgation of information relating to recently revoked certificates. Following the step 136, processing is complete.

If it is determined at the test step 134 that the RTCA has acknowledge receipt of the information sent at the step 132, then control transfers from the step 134 back to the step 122 to process a next iteration. In some embodiments, data is provided periodically from the CA to the RTCA(s) without regard for whether the RTCA(s) acknowledge receipt of the data. This is illustrated by an alternative path 137.

In some embodiments, the steps of the flow chart 120 are not performed periodically but, instead, are only performed in response to a specific request for data by the RTCA. This is illustrated by an alternative path 138 which causes control to transfer from the step 122 or the step 124 directly to the step 128. Note also an alternative path 142 which corresponds to receipt of the acknowledgement at the step 134. Thus, in embodiments where the steps of the flow chart 120 are not performed periodically, then, when it is determined at the test step 134 that the RTCA has acknowledged receipt of the information sent at the step 132, the path 142 indicates that processing is complete. Of course, it is also possible to have embodiments where the RTCA(s) do not acknowledge receipt of the information from the CA. This is illustrated by an alternative path 144.

Figure 6:
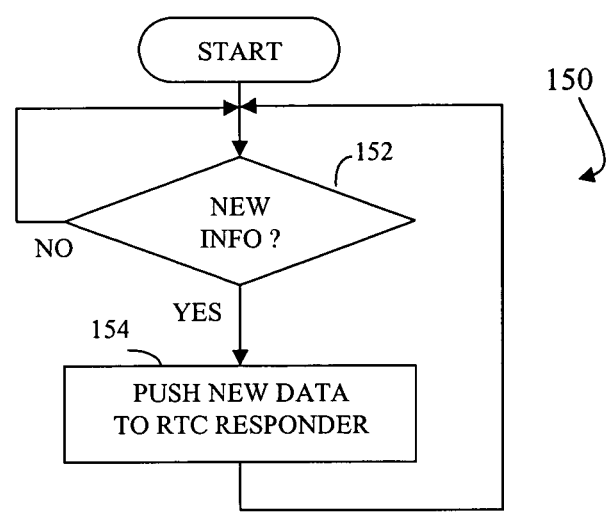
FIG. 6 is a flow chart illustrating pushing data from an RTCA to RTC responders according to an embodiment of the system described herein.

Referring to FIG. 6, a flow chart 150 illustrates processing performed by the RTCA for embodiments where data is periodically pushed from the RTCA to the RTC responders. Processing begins at a first step 152 where the RTCA determines if new data has been received since the previous push. If not, then control transfers back to the step 152 to continue to loop and poll until new data is received. Once it is determined at the test step 152 that new data has been received, then control transfers from the step 152 to a step 154 where the data is transferred from the RTCA to the RTC responders. Following the step 154, control transfers back to the step 152 to continue polling to wait for new data.

Figure 7:
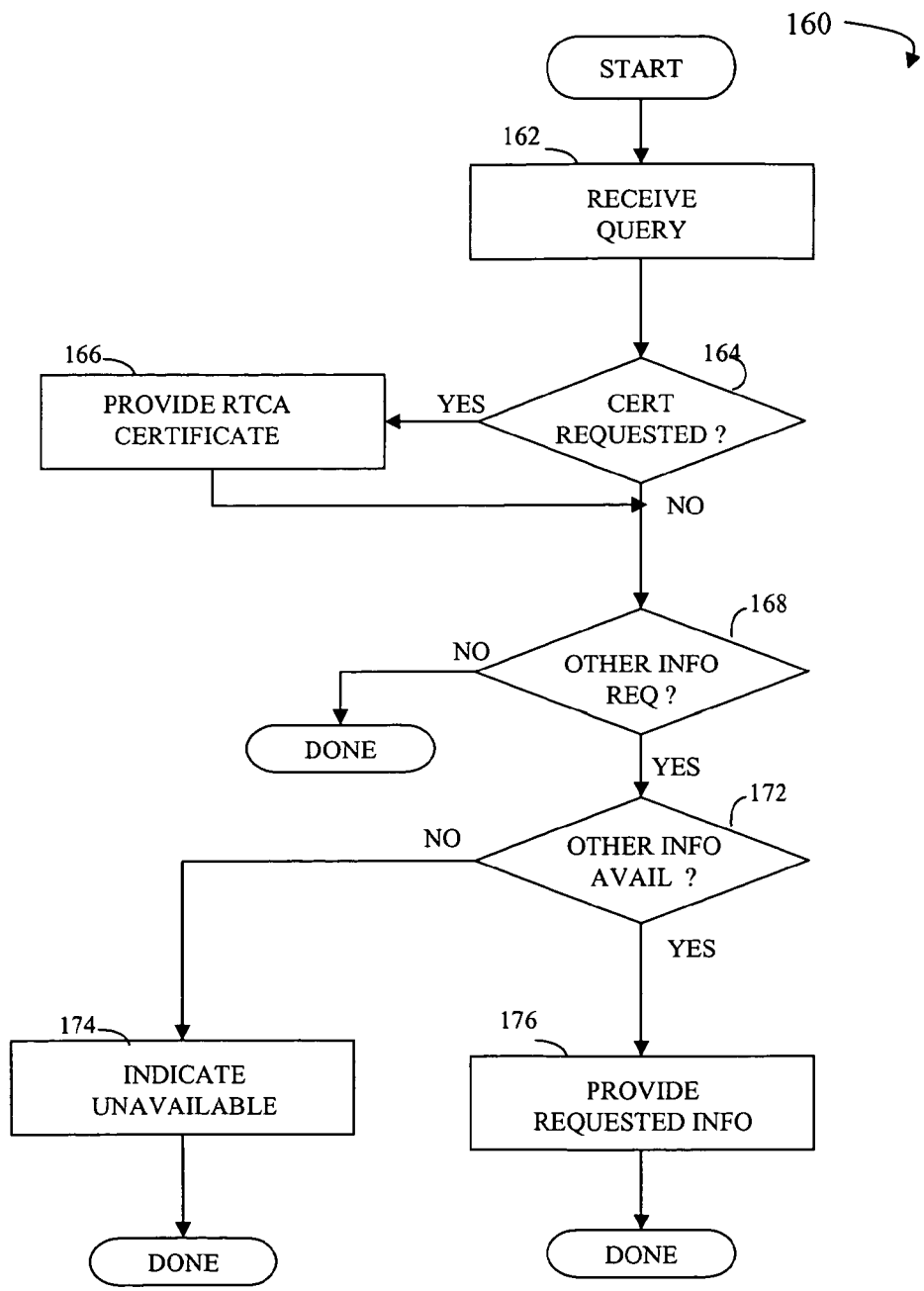
FIG. 7 is a flow chart illustrating RTC responders obtaining data from an RTCA according to an embodiment of the system described herein.

Referring to FIG. 7, a flow chart 160 illustrates steps performed by the RTCA for embodiments where data is provided from the RTCA to the RTC responders in response to a request by the RTC responders. As discussed elsewhere herein, the RTC responders may, themselves, periodically request data from the RTCA rather than relying on having the data be automatically pushed periodically from the RTCA to the RTC responders.

Processing begins at a first step 162 where the RTCA receives a query (request for data) from an RTC responder. Following the step 162 is a test step 164 which determines if the RTCA certificate was requested by the RTC responder. As discussed elsewhere herein, the RTCA certificate is used to show that the CA trusts and empowers the RTCA to provide validation information. In some embodiments, each RTC responder may cache the RTCA certificate (to be provided, if requested and/or necessary to relying parties), in which case it may be necessary to request the RTCA certificate only once. In other embodiments, the RTC responders may periodically request the RTCA certificate or, in some cases, always request the RTCA certificate.

If it is determined at the test step 164 that the RTC responder has requested the RTCA certificate, then control transfers from the test step 164 to a step 166 where the RTCA provides the RTCA certificate to the RTC responder. Following the step 166 or following the test step 164 if the RTCA responder has not requested the RTCA certificate is a test step 168 which determines if other information (i.e., an artificially pre-computed response) has been requested. If not, then processing is complete. Otherwise, control transfers from the test step 168 to a test step 172 which determines if the other information is available at the RTCA. In some cases, the other information requested by the RTCA responder may not be available at the RTCA. For example, if an RTCA responder requests information about a foreign certificate, an artificially pre-computed response may not be available at the RTCA.

If it is determined at the test step 172 that the requested information is not available, then control transfers from the test step 172 to a step 174 where the RTCA provides data to the RTC responder indicating that the information requested is unavailable. Following the step 174, processing is complete. If it is determined at the test step 172 that the requested other information is available, then control transfers from the test step 172 to a step 176 where the requested information is provided by the RTCA to the RTC responder. Following the step 176, processing is complete.

Figure 8:
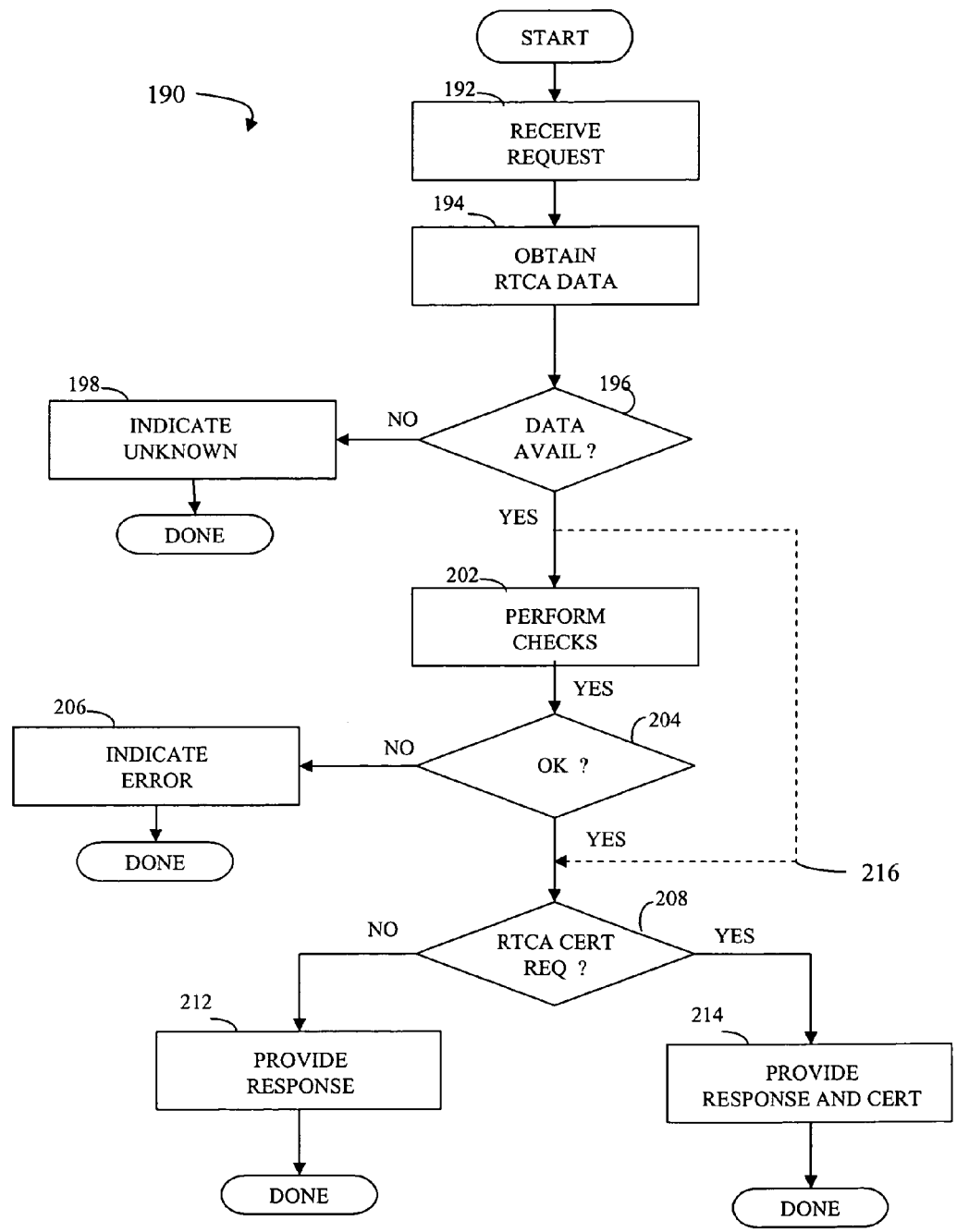
FIG. 8 is a flow chart illustrating an RTC responder providing information to a relying party according to an embodiment of the system described herein.

Referring to FIG. 8, a flow chart 190 illustrates steps performed by an RTC responder in connection with receiving a request for an artificially pre-computed response (e.g., an OCSP response) from a relying party. Processing begins at a first step 192 where the request is received. Following the step 192 is a step 194 where the RTC responder obtains RTCA data appropriate for the request. Obtaining RTCA data at the step 194 is discussed in more detail elsewhere herein. Following the step 194 is a test step 196 where it is determined if the requested data is available. If not, then control transfers from the test step 196 to a step 198 where the RTC responder provides a response to the relying party indicating that the status of the particular certificate is unknown. Following step 198, processing is complete.

If it is determined at the test step 196 that up-to-date validity data is available for the certificate(s) of interest, then control transfers from the test step 196 to a step 202 where checks are performed on the data. As discussed elsewhere herein, the checks performed at the step 202 may included any one or more of determining the currentness of the data, determining that the RTCA certificate has not been tampered with and is still valid, and any one or more other checks that may be performed on the data obtained at the step 194.

Following the step 202 is a test step 204 which determines if the results of performing the checks at the step 202 indicate that everything is okay. If not, then control transfers from the step 204 to a step 206 where the relying party is provided with an indication that the validity data is not okay. Other appropriate processing may be performed at the step 206 including, for example, notifying a system administrator of the error. Following the step 206, processing is complete.

If it is determined at the test step 204 that the validity data is okay, then control transfers from the test step 204 to a test step 208 where it is determined if the relying party requested the RTCA certificate. If not, then control transfers from the test step 208 to a step 212 where the relying party is provided with the validity data (artificially pre-computed response). Following the step 212, processing is complete. Otherwise, if it is determined at the test step 208 that the RTCA certificate was requested along with the validity data, then control transfers from the test step 208 to a step 214 where the validity data (artificially pre-computed response) and the RTCA certificate are provided to the relying party. Following the step 214, processing is complete.

For some embodiments, the relying party may perform its own checks of the validity data, in which case it may not be necessary to perform the checks at the step 202 or the corresponding test at the step 204. This is illustrated by an alternative flow path 216 from the step 196 to the step 208.

Figure 9:
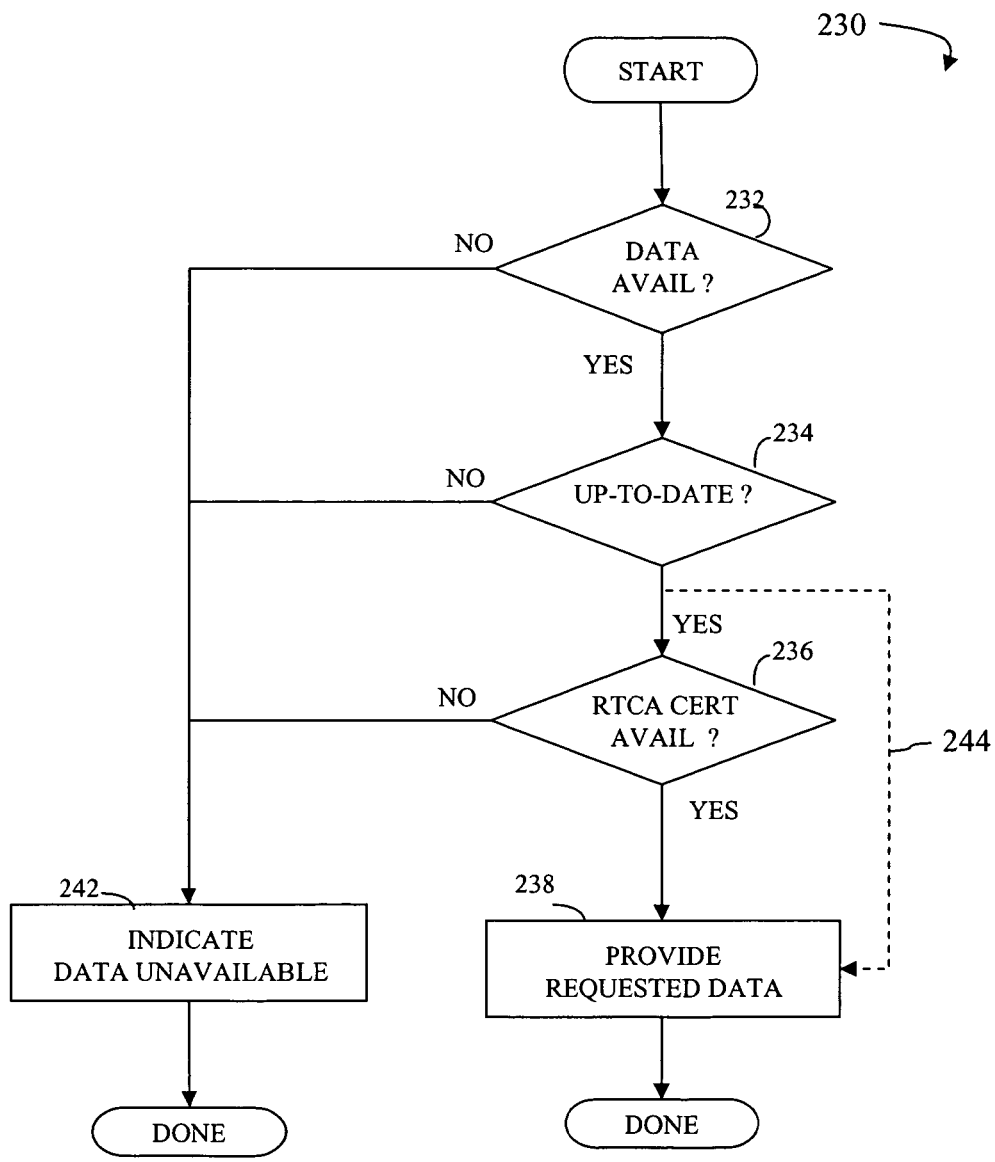
FIG. 9 is a flow chart illustrating an RTC responder obtaining validity information according to an embodiment of the system described herein.

Referring to FIG. 9, a flow chart 230 illustrates in more detail steps performed by the RTC responders in connection with obtaining RTCA data at the step 194 of the flow chart 190 of FIG. 8. The flow chart 230 corresponds to embodiments where RTCA data is pushed by the RTCA to the RTC responders automatically without the RTCA responders having to specifically request data. For these embodiments, the responders are always automatically in possession of the most up-to-date (or nearly up-to-date) RTCA data.

Processing begins at a first test step 232 where the RTC responder determines if the requested data is available at the RTC responder. If so, then control transfers from the test step 232 to a test step 234 which determines if the requested data at the RTC responder is up-to-date. As discussed elsewhere herein, the artificially pre-computed responses may include a time interval over which the artificially pre-computed responses are valid, after which a new artificially pre-computed response needs to be obtained. Irrespective of the specific mechanism used to determine the time intervals for the artificially pre-computed responses, it is determined at the test step 234 if the specific artificially pre-computed response requested by a relying party is up-to-date by comparing the current time to the time interval associated with the artificially pre-computed response.

If the data is up-to-date, then control transfers from the test step 234 to a step 236 which determines if the RTCA certificate is valid. In some instances, it may be possible for the RTCA certificate to be revoked (or expired) so that the data provided by the RTCA may not be reliable. For example, if the secret key of the RTCA is compromised, then the RTCA certificate may become revoked. Determining the validity of the RTCA certificate at the step 236 may be performed using any one of a number of known techniques, including techniques describe herein. If it is determined at the test step 236 that the RTCA certificate is valid, then control transfers from the test step 236 to a step 238 where the requested artificially pre-computed response is provided for further processing, as discussed above in connection with the flow chart 190 of FIG. 8. Following the step 238, processing is complete.

If it is determined at the test step 232 that the data is not available, or if it is determined at the test step 234 that the requested data is not up-to-date, or if it is determined at the test step 236 that the RTCA certificate is not valid, then control transfers to a step 242 where it is indicated that the data is unavailable in connection with follow on processing of steps of the flow chart 190 of FIG. 8. In some embodiments, the information provided at the step 242 may include a reason for the unavailability of the requested information. Following the step 242, processing is complete.

In some embodiments, it may be desirable not to check the validity of the RTCA certificate at each iteration. For these embodiments, the step 236 may be omitted, which is illustrated by an alternative path 244.

Note also that it is possible to use the processing illustrated by the flow chart 230 for embodiments where the RTC responders periodically request new data from the RTCA. In such a case, the data may not be available or up to date because it has not yet been requested by the RTC responder from the RTCA.

Figure 10:
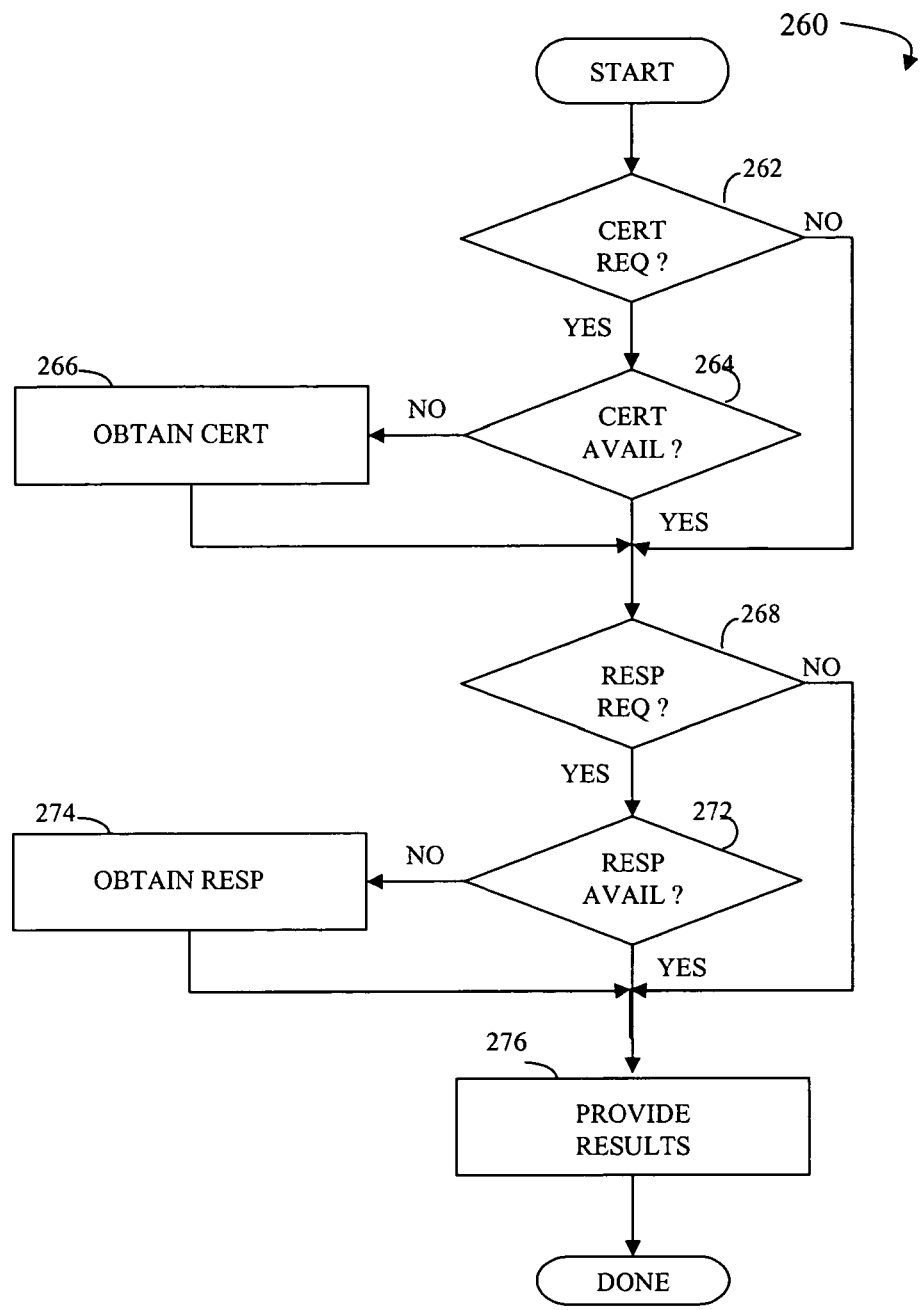
FIG. 10 is a flow chart illustrates an RTC responder obtaining validity information according to another embodiment of the system described herein.

Referring to FIG. 10, a flow chart 260 illustrates in more detail steps performed in connection with obtaining RTCA data at the step 194 of the flow chart 190 of FIG. 8 for embodiments where the RTC responder requests data from the RTCA. Processing begins at a first step 262 where it is determined if the relying party has requested the RTCA certificate. If so, then control transfers from the step 262 to a step 264 where it is determined if the RTCA certificate is cached by the RTC responder. If not, then control transfers from the test step 264 to a step 266 where the RTC responder requests RTCA certificate from the RTCA.

Following the step 266, or following the step 262 if the RTCA certificate is not requested or following the step 264 if the requested certificate is available, is a test step 268 where it is determined if an artificially pre-computed response has been requested. If so, then control transfers from the test step 268 to a test step 272 where it is determined if the requested artificially pre-computed response is cached (and, of course, up-to-date) at the RTC responder. If not, then control transfers from the test step 272 to a test step 274 where the RTC responder requests the artificially pre-computed response from the RTCA. Following the step 274 or following the step 268 if no artificial pre-computer response was requested or following the step 272 if the requested artificial pre-computer response is cached, is a step 276 where the results of obtaining the requested information are provided for follow on processing according to steps of the flow chart 190 of FIG. 8. Following the step 276, processing is complete.

Figure 11:
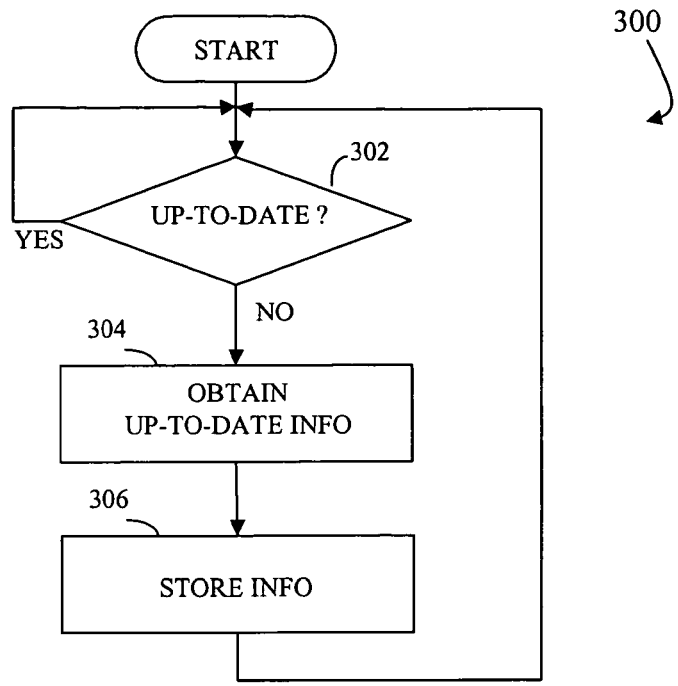
FIG. 11 is a flow chart illustrating steps performed in connection with facilitating a two-party transaction according to an embodiment of the system described herein.

Referring to FIG. 11, a flow chart 300 illustrates steps performed by either a user or a relying party with whom the user transacts in connection with embodiments where a two party transaction set up to avoid extra steps and processing of a three party transaction, as described above. Processing begins at a first test step 302 where it is determined if the information (artificially pre-computed response) that a user and/or relying party has cached is up-to-date (or exists locally at all). If so, then control transfers back to the test step 302 to continue to poll until the information is not up-to-date. Once it is determined at the test step 302 that the cached information is not up-to-date, then control transfers from the test step 302 to a step 304 where the entity (user and/or relying party) obtains up-to-date information as described elsewhere herein. Following the step 304 is a step 306 where the information obtained at the step 304 is stored locally (cached). Following the step 306, control transfers back to the step 302 to continue to poll until the cached information is no longer up-to-date.

Figure 12:
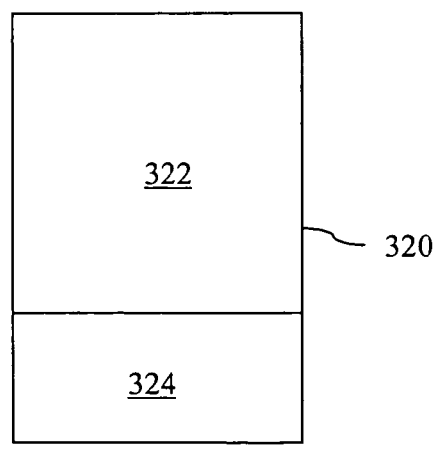
FIG. 12 is a diagram illustrating a digital certificate according to an embodiment of the system described herein.

Referring to FIG. 12, a certificate 320 is shown as including conventional certificate information 322 and RTCA certificate information 324. The certificate 320 may be a user certificate or a CA certificate. As described above, in some embodiments, it is possible to embed the public key certified by the RTCA certificate 324 in a certificate. When a relying party views the certificate 320 (either the user certificate or the CA certificate), it is not necessary to separately obtain the RTCA certificate. In other embodiments, the RTCA certificate information 324 includes the entire RTCA certificate or a pointer thereto.

Figure 13:
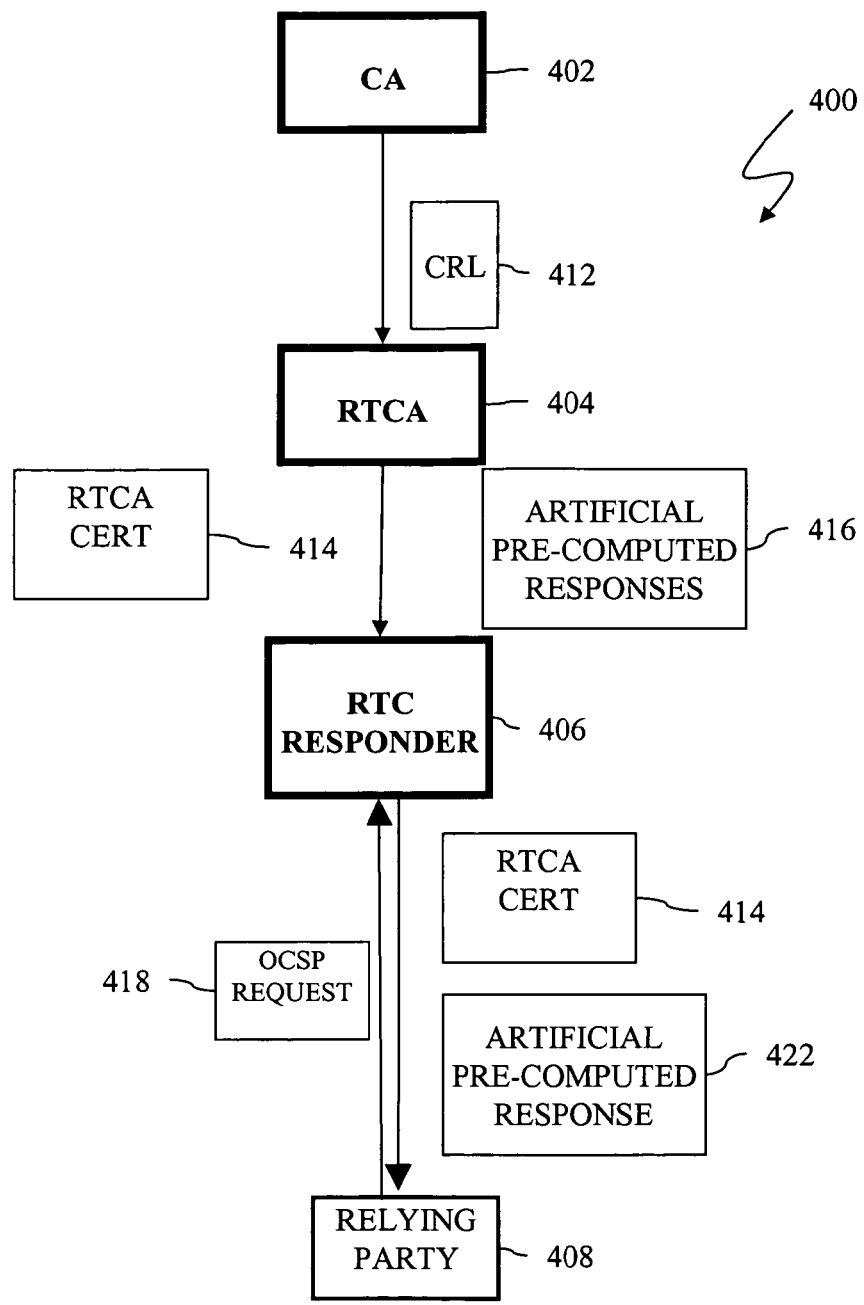
FIG. 13 is a diagram illustrating flow of data between a CA, an RTCA, an RTC responder, and a relying party according to an embodiment of the system described herein.

Referring to FIG. 13, a diagram 400 illustrates a flow of information between a CA 402, an RTCA 404, an RTC responder 406, and a relying party 408. As discussed elsewhere herein, the CA 402 provides validation information (e.g., a CRL) 412 to the RTCA 404. The RTCA 404 generates a plurality of artificially pre-computed responses 416 that are provided to the RTC responder 406. In some instances, the RTCA 404 may also provide an RTCA certificate 414 to the RTC responder 406. However, as discussed elsewhere herein, the RTCA certificate 414 may be provided only once or may be provided periodically independent of the RTCA 404 providing the artificially pre-computed responses 416 to the RTC responder 406.

A relying party 404 generates an OCSP request 418 (or some other type of request for validity information) that the relying party 408 provides to the RTC responder 406. The RTC responder 406 services the OCSP request 418 by providing an artificially pre-computed OCSP response 422 that is one of the artificially pre-computed OCSP responses 416 previously provided from the RTCA 404 to the RTC responder 406. The relying party 408 may then use the artificially pre-computed response 422 to take appropriate further action based on the validity status of the certificate in question. As discussed elsewhere herein, in some instances, the RTC responder 406 may provide the RTCA certificate 414 to the relying party 408.

Figure 14:
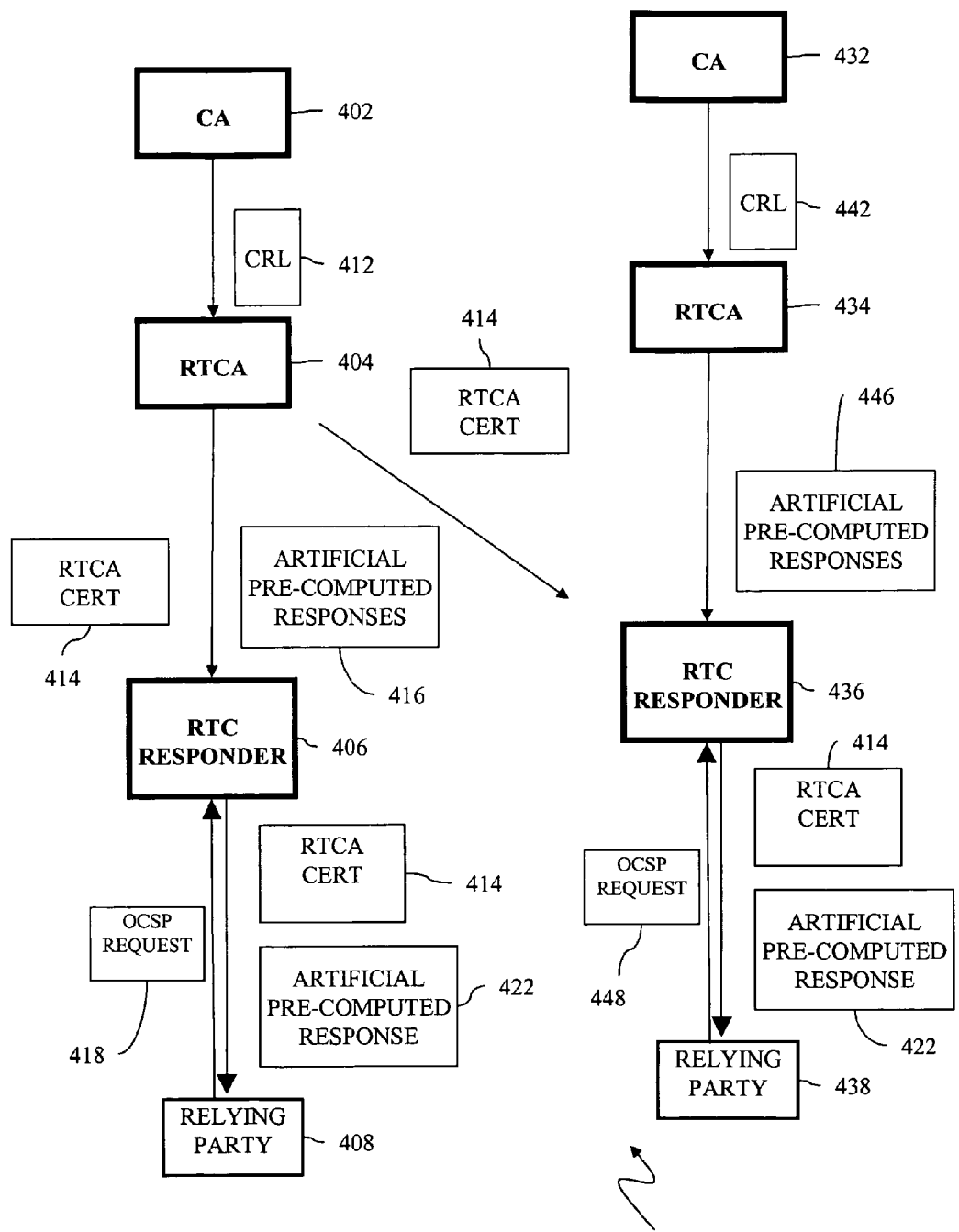
FIG. 14 is a diagram illustrating flow of data between a CA, RTCA, RTC responder, and relying party of a first system and a CA, RTCA, RTC responder, and a relying party of a second system according to an embodiment of the system described herein.

Referring to FIG. 14, a diagram 430 illustrates communicating validation information between two otherwise independent digital certificate systems. The diagram 430 shows the CA 402, the RTCA 404, the RTC responder 406 and the relying party of 408 of the diagram 400 of FIG. 13. The diagram 430 also shows the validation information 412 provided by the CA 402 to the RTCA 404 and shows the RTCA certificate 414 and the artificially pre-computed responses 416 communicated from the RTCA 404 to the RTC responder 406.

The diagram 430 also shows a second CA 432, a second RTCA 434, a second RTC responder 436, and a second relying party 438. The second CA 432 provides validation information 442 to the second RTCA 434. The second RTCA 434 provides artificially pre-computed responses 446 to the second RTC responder 436. However, assuming that the CA 402 and the second CA 432 manage independent sets of digital certificates, then the CRL 412 contains information about different certificates than the CRL 442 and the artificially pre-computed responses 416 contain information about different certificates than the artificially pre-computed responses 446. Thus, when the second relying party 438 provides an OCSP request 448 to the second responder 436 about a certificate managed by the CA 402, none of the artificially pre-computed responses 446 provided by the second RTCA 434 may be appropriate for satisfying the OCSP request 448.

The above-described difficulty may be addressed if the RTCA 404 had provided the artificially pre-computed responses 416 to the second RTC responder 436 and if the RTCA 404 had previously provided the RTCA certificate 414 to the second RTC responder 436, then the second RTC responder 436 may satisfy the OCSP request 448 by providing to the second relying party 438 the RTCA certificate 414 and the artificially pre-computed response 422 generated by the RTCA 404. Note that, as discussed elsewhere herein, it is not necessary for the transmission from the RTCA 404 to the second RTC responder 436 to be secure since the RTCA Certificate 414 and the artificially pre-computed responses 436 have already been digitally signed prior to transmission to the second responder 436.

Figure 15:
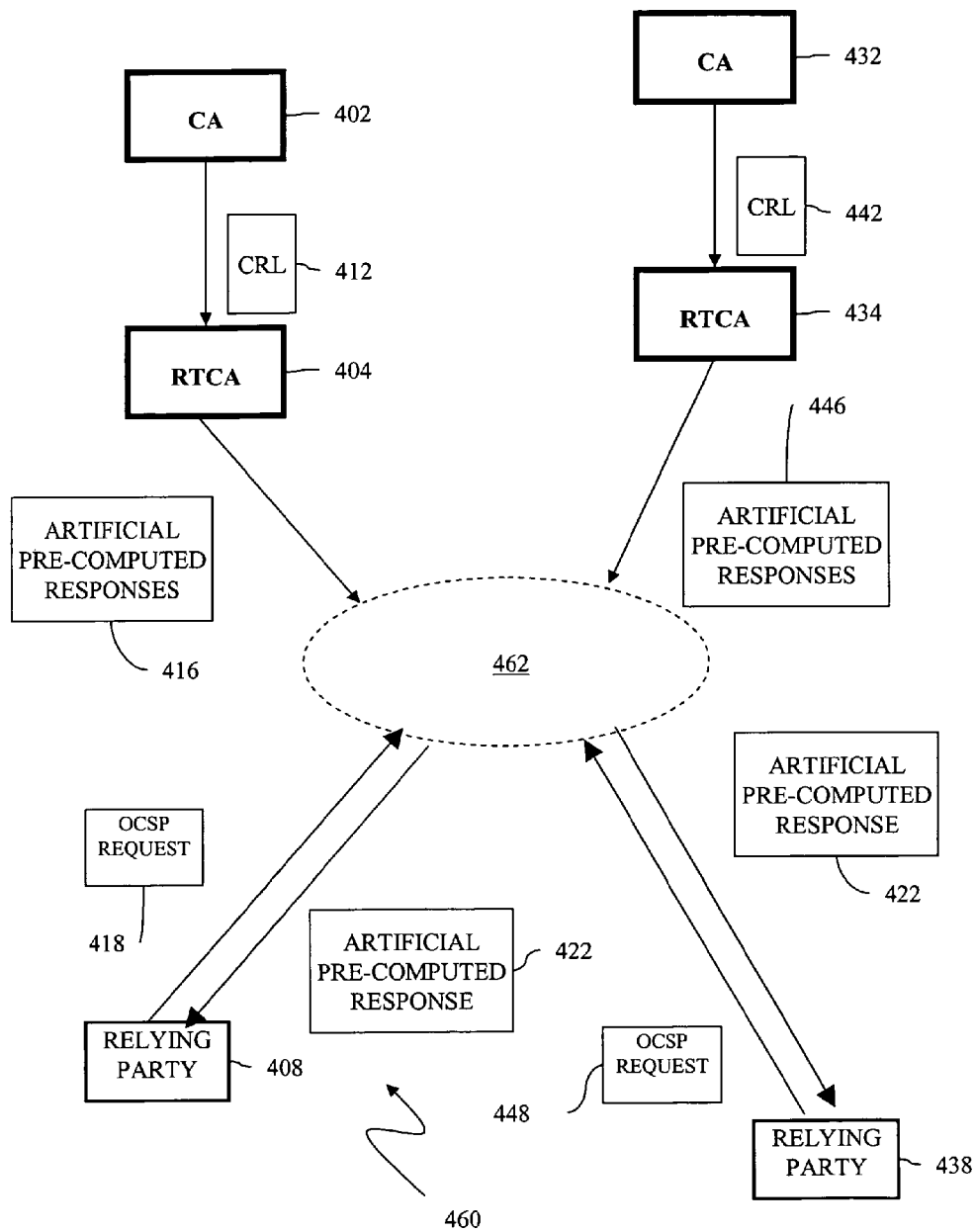
FIG. 15 is a diagram illustrating a heterogeneous cloud of RTC responders according to an embodiment of the system described herein.

Referring to FIG. 15, a diagram 460 illustrates a generalization of the system illustrated by the diagram 430 of FIG. 14. In the diagram 460, the RTCA 404 provides the artificially pre-computed responses 416 to a heterogeneous cloud 462 of RTC responders. Similarly, the second RTCA 434 provides the artificially pre-computed responses 446 to the heterogeneous cloud 462 of RTC responders. The RTCA's 404, 434 may also provide their respective RTCA Certificates (not shown) to the heterogeneous cloud 462 of RTC responders. Note that any number of RTCA's may provide artificially pre-computed responses and/or RTCA certificates to the heterogeneous cloud 462 of RTC responders. Thus, the relying party 408, the second relying party 438, or some other relying party may receive an appropriate one of the artificially pre-computed responses and, optionally, an RTCA Certificate in response to an OCSP request (or some other type of request) for any certificate for which artificially pre-computed responses are provided to the heterogeneous cloud 462.

While the techniques discussed above address many of the traditional OCSP drawbacks, such as costly computation, high volume of communication and expensive replication of secure servers, further optimizations are possible to reduce computation and communication cost even more. In particular, the amount of communication between the RTCA and the RTC responders may be reduced by proper compression, as described below. The resulting savings from the combination of the techniques described below may be significant, particularly when standard OCSP syntax is used.

As discussed above, the RTCA sends to each RTC responder artificially pre-computed responses, each of which may consist of multiple data elements, such as, for example, the response type, the time at which the response was computed, the digital signature algorithm identifier, id of the RTCA, the certificate number, whether the certificate is valid or invalid, etc., as well as the digital signature itself. Many of these items are the same, or similar, across multiple responses. For instance, the time at which the response was computed and the id of the RTCA may be the same for all the responses. When all the responses are sent together from the RTCA to the RTC responder, the common elements may be transmitted only once. The RTC responder may still reconstruct the appropriate response when answering a relying party's request. Furthermore, when data items are similar, but not the same, a proper compression algorithm may be used so as to take advantage of the similarities and communicate only the differences.

In addition, to further reduce the cost of computing the responses and communicating to the responders, it may be beneficial to update the responders on the validity status of some, but not all certificates. For example, the validity status of all certificates may be updated hourly, while some high-priority (e.g., high-security) certificates may have their status updated every minute. Alternatively (or in addition), freshly revoked certificates may have their validity status updated immediately with responders to reduce the risk of improper use. As another alternative, the RTCA may provide the responders with up-to-the-minutes updates for certificates whose status has changed, while still providing daily (or hourly, etc.) signed validity status information for all certificates.

Standard general compression techniques (such as Lempel-Ziv) can be used to further reduce the communication cost. The compression techniques may be applied after the optimizations discussed above have already reduced the size of the communication.

The optimizations discussed above reduce the computational load on the RTCA and the communication cost between the RTCA and the responders, because, in many cases, a smaller number of signatures need to be computed. Indeed, by reducing the latency incurred by the computation and the communication, this approach increases security: the responders have more current information than they would if the RTCA had to always process and send the validity status of all digital certificates.

Figure 16:
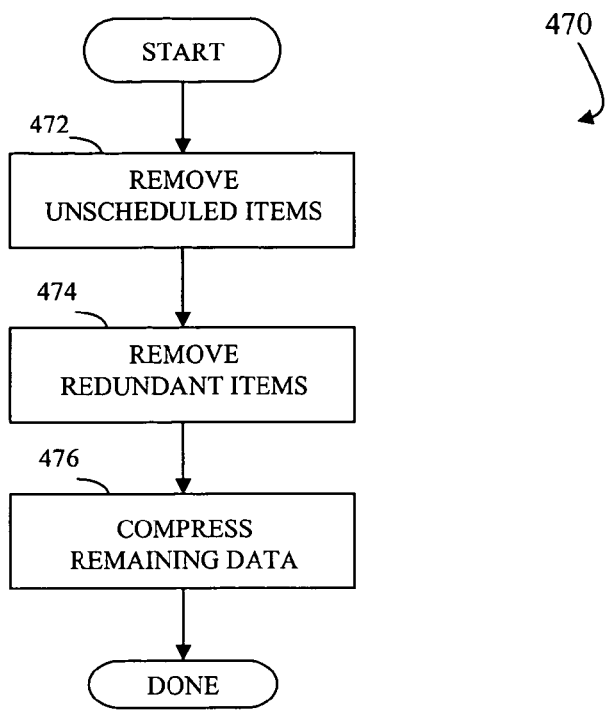
FIG. 16 is a flow chart illustrating optimizations according to an embodiment of the system described herein.

Referring to FIG. 16, a flow chart 470 illustrates steps for compressing data communicated between the RTCA and the RTC responders. Processing begins at a first step 472 where unscheduled items are removed for transmission. As discussed above, one of the possible optimizations is to update information about certificates at different rates where more important certificates are updated more frequently. Thus, at each update cycle, information about less important, unscheduled, certificates are removed from the information to be sent from the RTCA to the RTC responders.

Following step 472 is a step 474 where redundant items are removed from the remaining data. As discussed above, the redundant items include items that are the same across information that is being transmitted. For example, the identity of the RTCA and the time of update may be the same for all of the information being transferred from the RTCA to the RTC responders. Following step 474 is a step 476 where a compression algorithm is applied to the information that remains. Various possible compression algorithms are discussed above. Following the step 476, processing is complete.

Proving the validity of a certificate is valuable in proving one's claimed identity. However, in some cases, proving one's claimed identity is often associated with the privilege to access a particular physical location, logical entity or service. The association of identity and privilege may be implicit and may not accommodate the need to control multiple independent privileges for the same user. A different approach is to employ a separate privilege status for each independent privilege. The RTCA may be extended to provide explicit privilege status for multiple privileges in addition to providing certificate status.

Privileges may be granted to a user by one or more Authorization Authorities. This may be an implicit process in which the Authorization Authority and the CA are the same entity. In such a case, a user proving his identity may establish the user's right to access to a particular location, logical entity or service. However, a drawback to this approach is that the privilege status may be identical to the certificate or identity validity status, thus resulting in a single yes/no answer for all implied privileges. This may be addressed by extending the RTCA to provide individual, independent privilege status for an individual user as described below.

Initially, the CA may certify the RTCA as a privilege management authority. This may be performed, for example, as part of the general CA certification process described elsewhere herein. The CA may digitally sign a certificate indicating that the CA trusts and empowers the RTCA to provide multiple, independent privilege status in addition to certificate validity status. The empowerment may either be implicitly or explicitly indicated in the RTCA certificate.

Following the certification, the Authorization Authority may inform the RTCA of the current state of various privilege statuses. The Authorization Authority may keep the RTCA apprised of the validity statuses of the privileges that are authorized for each of the users over which the Authorization Authority has control. For example, the Authorization Authority may (1) inform the RTCA of any privilege status change in an on-line fashion as soon as the change occurs, or (2) post or send to the RTCA a digitally signed message indicating the change.

Identifying an entity as an empowered Authorization Authority may be done using a digitally signed certificate issued by an appropriately trusted and empowered CA. The privileges controlled by each Authorization Authority may be bound to that authority either within the certificate itself (i.e., by the CA) or in a database located at the RTCA or by some other appropriate means.

The RTCA may include the status of each privilege associated with a given certificate when the RTCA generates individually signed certificate validity status message. As part of the process for providing the validity status of a certificate, the RTCA may include an identifier and current status of each privilege associated with the certificate in question. The time interval associated with the privilege status may be the same as that applied to the certificate validity status. In this aspect, pre-computing various privilege statuses may be identical and concurrent with techniques used for certificate status validation as described above. The privilege statuses may be included in the same digitally signed message as certificate status validation.

The RTCA may send the pre-computed privilege validity statuses to unprotected RTC responders. The process of distributing the various privilege statuses may be identical and concurrent with that used for certificate status validation as described above. The responders may then store the RTCA pre-computed privilege statuses. In instances where privilege status validation information is included as part of the certificate status validation information, then the privilege status information may be stored as a single response by the responder as described above and/or may be stored together with certificate validation information.

When relying parties ask responders for validity status information of a certificate as described above, the RTC responders may provide the RTCA pre-computed response, which includes the certificate validity status and all associated privilege statuses. The relying parties may then verify the pre-computed responses (and, if appropriate, RTCA certificates). The processing of the received responses by the relying parties may be similar to that described above except that now any associated privilege statuses are also available. The privilege statuses may be read and used in determining whether or not to grant requested access. The RTC system, extended to provide multiple, explicit privilege statuses, may be analogous to the system described elsewhere herein for providing certificate status, except that the pre-computed OCSP responses may now be understood to contain the privilege validity statuses as well as the certificate validity status information.

Figure 17:
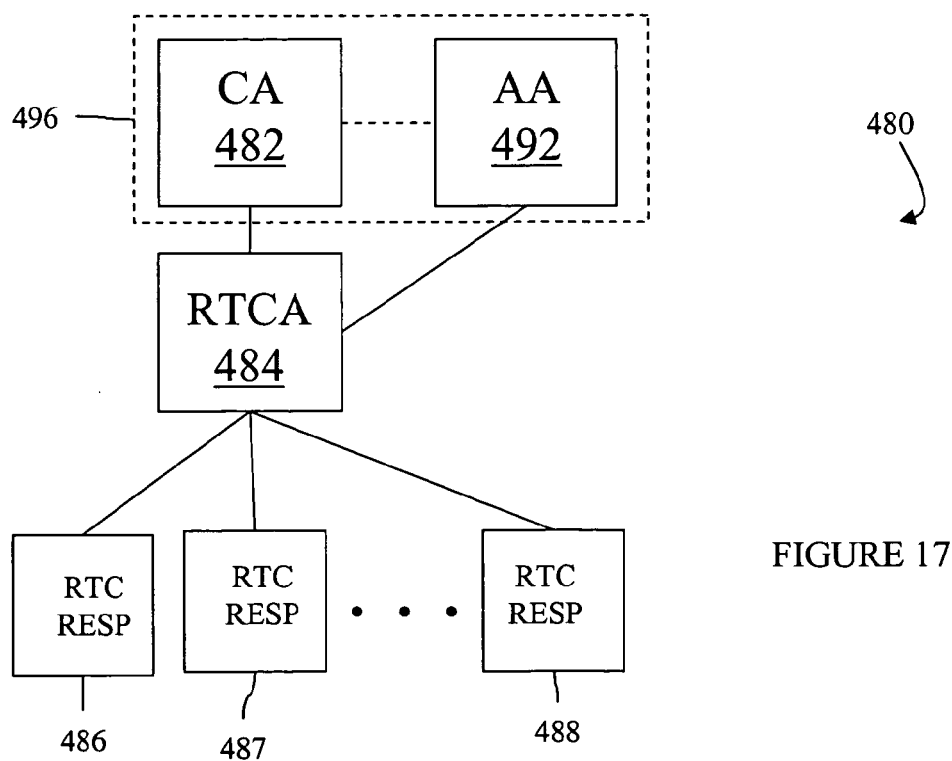
FIG. 17 is a diagram illustrating an authorization authority according to an embodiment of the system described herein.

Referring to FIG. 17, a diagram 480 illustrates implementation of an Authorization Authority. The diagram 480 shows a CA 482 coupled to an RTCA 484. The CA 482 provides information to the RTCA 484 as described elsewhere herein. The RTCA 484 is coupled to a plurality of RTC responders 486-488 to provide information thereto as described elsewhere herein.

The diagram 480 also shows an Authorization Authority 492 that provides authorization information to the RTCA 484. Optionally, the CA 482 may be directly coupled to the Authorization Authority 492 to provide, for example, initial authorization information, an Authorization Authority Certificate, and any other appropriate information. As discussed elsewhere herein, the CA 482 and the Authorization Authority 492 may be the same entity, which is illustrated by a box 496 drawn around the CA 482 and the Authorization Authority 492. Although not shown in the diagram 480, the system described herein with the Authorization Authority 492 may include additional RTCAs, responders, etc. as described elsewhere herein (see, for example, FIG. 3 and the corresponding description).

Note that, in some embodiments, the CA 482 may provide the Authorization Authority certificate directly to the RTCA 484, without providing the certificate from the CA 482 to the Authorization Authority 492. Note also that the Authorization Authority certificate (or other evidence of empowerment) may be provided in certificates issued by the CA 482 (analogous to that illustrated in FIG. 12 and discussed above) or by other information provided by the CA 482 to the RTCA 484.

While an RTC system addresses many of the OCSP drawbacks, further optimizations may be possible. In particular, the computational cost of the RTCA may be reduced by processing multiple digital signatures at once. For the system described above, the RTCA signs the status of each digital certificate. Even though this is done in advance, possibly even before status queries are even made, it is desirable to reduce the computation cost of this process, particularly because production of digital signatures may be computationally intensive.

As described in more detail below, improvements may be provided by having a Signature-Efficient RTCA (SERTCA) coalesce the status of a plurality of certificates into a single statement, and then sign and date the statement, thereby using a single signature to authenticate the statuses of the plurality of certificates at a given point in time. The number of certificates whose statuses are so authenticated may be fixed (i.e., every statement always contains status information about the same number of certificates), or may vary. Certificates identified in a single statement may also be identified in other statements. For instance, one statement may represent the validity status of all certificates belonging to a given individual, and another may represent the validity of all certificates having serial numbers in a certain integer interval. The same certificate may belong to both sets and thus belong to two separate authenticated statements.

After authenticating all statements of a given time interval, the SERTCA may then send the statements to one or more RTC responders, which store the statements so as to service queries of relying parties. When receiving a query about a certificate X, an RTC responder may retrieve the SERTCA-signed statement that contains the validity status of X and return the statement to the relying party. The relying party may verify the SERTCA signature and search the statement for information about X, to thus learn X's status in an authenticated manner.

Of course, a SERTCA may also issue statements about the status of a single certificate, and thus, the SERTCA may provide the same information as an RTCA if the SERTCA issues statements only about single certificates. A particular SERTCA may act as an RTCA at some times and not at others (for instance, depending on the computational constraints and needs at a particular time). A system may combine RTCA's and SERTCA's.

Initially, the CA certifies a SERTCA in a manner similar to that discussed above for certifying the RTCA, discussed above Just as with an RTCA, a SERTCA is an entity that may or may not coincide with the CA of a given organization. Each CA may provide its own one or more SERTCA's where each SERTCA has a special certificate, the SERTCA certificate. The CA may digitally sign the SERTCA certificate, indicating that the CA trusts and empowers the SERTCA to provide certificate validity information about certificates of the CA. Such a certificate conveys SERTCA status to a given entity (e.g., identified by a given identifier, OID number, etc.) and may bind a given verification key PK (for which the given entity possesses a corresponding secret signing key) to the given entity.

Just as with the RTCA, even if the CA and the SERTCA coincide, it may still be advantageous for the CA and the SERTCA to have distinct signing keys. Thus, whether or not CA and SERTCA represent the same entity, the CA (component) issues certificates and the SERTCA (component) manages the certificates (e.g., proves the certificates valid/revoked/suspended). This being the case, even if the CA and the SERTCA coincided, a separate SERTCA certificate might still be used. In some embodiments, each CA has only one SERTCA, though for redundancy purposes or other purposes, it may be advantageous to have more than one, whether or not using the same signing key. If there are multiple SERTCAs, some may simply act as RTCAs.

Note that, just as with an RTCA, an SERTCA protects its signing key, for instance by means of a vault, secure facility, or secure hardware. The CA keeps a SERTCA apprised of the validity status of its certificates. For instance, the CA may (1) inform a SERTCA of any change in certificate validity in an on-line fashion, as soon as a change occurs, or (2) send a SERTCA its CRL's when produced. At any date Di of a sequence of dates, D1, D2, . . . , a SERTCA, based on its current knowledge of validation status (e.g., based on the latest CRL of the CA) and independent of any relying-party request, performs an update by processing each outstanding (preferably non expired) certificate of the CA, coalescing information about validity statuses of certificates into sets, and digitally signing, for each set, a declaration (artificially pre-computed response) stating the status of each certificate in the set. For instance, such status may be valid, revoked, or suspended (or, possibly, "unknown" or "not issued" or another status indication). The signed declaration may specify a time interval T. In some embodiments, at each update, every signed declaration may specify the same time interval T, and the totality of these time intervals may cover the entire "time line." For instance, at each update date Di, the time interval is T=Di+1−Di—where possibly only one of Di and Di+1 is part of T, while the other date is part of an adjacent time interval.

As an example, a sample declaration may have the form SIG-SERTCA ("X: valid; Y: revoked; Z: suspended; date: Di; next date: Di+1."), where X, Y and Z represent information identifying particular certificates (e.g., serial numbers), and "valid," "invalid", "revoked" are indicators of corresponding certificate status. If the SERTCA's current knowledge about certificate status is based on the CA's CRLs, then each Di may coincide with the date of one CRL, and Di+1 with the date of the next CRL. It should be appreciated, though, that such strict time dependency is not necessary. For instance, the dates at which the SERTCA processes or starts processing its declarations may be D1, D2, etc., while the time intervals specified within the declarations may be D1', D2', etc., where Di and Di' may be different. For instance, Di may be earlier than Di', in which case the RTCA may start processing a declarations before the beginning of the declaration's time interval—e.g., because the SERTCA wishes to finish its processing by the beginning of interval T. Similarly, if CRLs are used in SERTCA updates, declaration times and CRL times may be different too.

In essence, therefore, the SERTCA pre-computes digital signatures indicating the statuses of all certificate for a given time interval T. Such pre-computation may be performed independent of any relying party request about the certificates' validity. The SERTCA may pre-compute signed declarations for a given time interval before any status query ever made in that interval or even before that time interval starts. The SERTCA-signed declarations of certificate status (artificially pre-computed responses) may be in standard OCSP format or in a format compatible with existing relying-party software. This is useful in instances where OCSP software is already in place minimize or eliminate modifications to existing relying-party software. For instance, to ensure OCSP-compliance all relevant quantities, digital signature algorithms, OIDs, etc., may be properly chosen.

Note, however, that SERTCA's syntactically correct OCSP responses may not necessarily be traditional OCSP responses because the SERTCA responses are not computed in response to any original/initial request. In essence, the SERTCA pre-computes OCSP-compliant responses to OCSP requests that have not yet been generated, and may never be generated. The SERTCA responses, whether or not in OCSP format, are artificially pre-computed responses.

After pre-computing the responses, a SERTCA may make the responses available to other parties. Although the SERTCA could return the responses to relying parties in response to validity status queries, in other embodiments the SERTCA may provide the pre-computed responses to RTC responders, which are like the RTC responders described above as being used in connection with the RTCA's.

A SERTCA may facilitate the RTC responders' processing of signatures by presenting the signatures to RTC responders in a suitably organized fashion. To ensure that all the relevant pre-computed responses have been received, at every update a SERTCA may provide RTC responders with an additional signature, by signing and dating the totality of the artificially pre-computed responses received by the RTC responder. In addition, a SERTCA may send to the RTC responders a SERTCA certificate. This transmission needs not occur at every update and may be performed only initially or periodically.

The RTC responders may store the received artificially pre-computed responses of a SERTCA for a sufficient time. In some embodiments, if the signatures relate to a given time interval T, the RTC responders may store the artificially pre-computed responses at least until the end of T. In some embodiments, the RTC responders (especially those belonging to the same organization as the SERTCA) may check to have correct information. For instance, an RTC responder may verify that the artificially pre-computed responses about a time interval T are received by the beginning of T (or other suitable time related to T), verify all received SERTCA signatures (and possibly also the proper SERTCA certificate), verify whether the RTC responder has received information about all the certificates (e.g., no less than the expected number of certificates, no fewer certificates than of last transmission for already issued certificates, etc.), verify whether the RTC responder has received a SERTCA-signed declaration of validity for a certificate that was previously declared revoked, etc. If any problem is detected, the RTC responder may so inform the SERTCA or another proper entity.

Relying parties may ask RTC responders for the validity status of certificates. In some embodiments, the relying parties use the OCSP format for the requests. If information on the status of the same certificate appears in more than one statement, the relying party may indicate to the RTC responder which of the statements is preferred by the relying party. For instance, if the SERTCA provides statements representing the validity status of all certificates belonging to a given individual, as well as statements representing the validity status of all certificates having serial numbers in a certain integer interval, and the relying party is primarily interested in the validity status of a certificate with serial number X belonging to individual I, the relying party may provide an indicator indicating preference to receive (a) a SERTCA-signed statement that includes information about certificates with serial number close to X, or (b) a SERTCA-signed statement that includes information about other certificates of I, or (c) a SERTCA-signed statement that is very short, or (d) any SERTCA-signed statement that includes information about X's status (i.e., no preference). There may be advantages to one of the choices, depending on the circumstances.

When asked about the validity of a given certificate, an RTC responder may fetch from memory an SERTCA artificially pre-computed response that includes information for that certificate. The RTC responder may return the artificially pre-computed response. The RTC responder may also forward a proper certificate for the SERTCA that has signed the artificially pre-computed response. Note that the relying party may provide an indication so as not to receive the SERTCA certificate, or the RTC responder may know or assume that the relying party already has a copy of the SERTCA certificate. If there are multiple pre-computed answers that contain information about the same certificate, the RTC responder may choose which answer to return according to the relying party's preferences, or some pre-specified algorithm, or according to some other criterion.

Relying parties process the received responses to ascertain the validity status of the certificate of interest. In some embodiments, if the response is in OCSP format, the RTC responders use OCSP software for such processing. The RTC Responders may verify the proper SERTCA certificates. In case of OCSP-compliant implementation, the RTC responders may verify an SERTCA certificate as an OCSP responder certificate. In some embodiments, an SERTCA certificate may be syntactically constructed as an OCSP-responder certificate.

Figure 18:
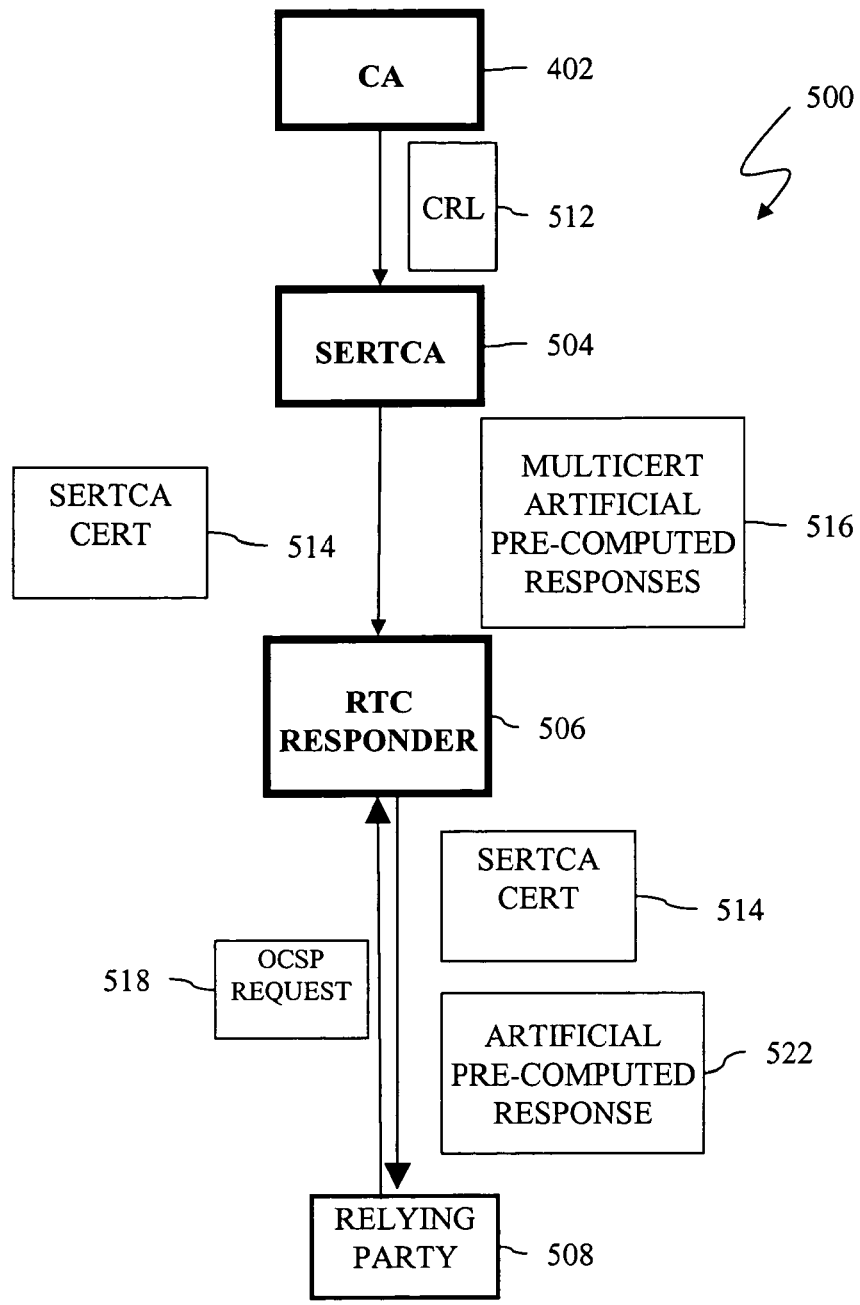
FIG. 18 is a diagram illustrating a flow of data between a CA, an SERTCA, an RTC responder, and a relying party according to an embodiment of the system described herein.

Referring to FIG. 18, a diagram 500 illustrates a flow of data between a CA 502, an SERTCA 504, an RTC responder 506 and a relying party 508. The CA 502 provides validation information (e.g., a CRL) to the SERTCA 504. The SERTCA 504 uses the validation information to generate a plurality of multi-certificate artificially pre-computed responses 516. The SERTCA 504 also has its own certificate 514 that is provided to the SERTCA 504 by, for example, the CA 502.

The relying party 508 generates an OCSP request 518 that the relying party 508 provides to the RTC responder 506. In response thereto, the RTC responder 506 provides a multi-certificate artificially precomputed response 522 that is one of the multi-certificate artificially pre-computed responses 516 that was originally provided to the responder 506 by the SERTCA 504. In addition, as discussed elsewhere herein, in some instances the responder 506 provides the SERTCA certificate 514 to the relying party 508.

Note that the processing described above for an RTCA system may be adapted, as appropriate, to be used with an SERTCA system and/or with a hybrid system, including using an Authorization Authority, as described above, and providing the compression optimizations discussed above in connection with FIG. 16. Similarly, the processing described above for an SERTC system may be adapted, as appropriate, to be used with an RTCA system and/or with a hybrid system.

Another technique, batch OCSP, may be used to reduce RTCA or SERTCA computation cost. Batch OCSP may be used alone or in combination with one or more of the other mechanisms discussed herein.

Batch OCSP may be employed when the specific digital signatures used in the responses are RSA digital signatures. While SERTCA improves signature efficiency by authenticating the statuses of multiple certificates in a single signature, batch OCSP may improve efficiency by producing multiple, single-certificate OCSP responses by means of a single computation, having a cost per response that is significantly lower than that of a single OCSP response. For instance, if ten single-certificate OCSP responses are produced individually, the cost is roughly that of ten RSA signatures for an RTCA (or a conventional OCSP responder). The SERTCA mechanism, described above, can reduce the cost to one RSA signature by combining the information on the ten certificates into a single statement. However, a drawback to using an SERTCA is that the corresponding statement becomes longer. Batch OCSP may produce ten distinct, single-certificate, individually-signed OCSP responses at a total cost lower than the cost of ten RSA signatures (in some cases roughly the cost of two RSA signatures).

Batch OCSP is based on Fiat's Batch RSA computation, described as follows. The public key PK for RSA consists of two integers, (N, e), known as the modulus and the verification exponent, respectively. The modulus is a product of two large secret prime numbers p and q, and the security of RSA rests on the difficulty of finding the constituent primes from the modulus N. The corresponding secret key SK consists of (N, d), where d has the following property: for all positive integers b less than N, ifs is equal to b raised to the power d modulo N, then b is equal to s raised to the power e modulo N. In other words, the operation of raising an integer to the power e modulo N is the inverse of the operation of raising an integer to the power d modulo N.

The computation of an RSA digital signature involves (possibly randomized) formatting and/or hashing of the message m to obtain b, and then the computation of the signature s by raising b to the power d and then taking the result modulo N. The corresponding verification procedure computes b from s by raising s to the power e modulo N, and checks that b is indeed correctly produced from m. An observation of Fiat's Batch RSA signatures is the following. Suppose one has multiple values $b_1, \ldots, b_i$, and multiple verification exponents $e_1, \ldots, e_i$ and corresponding signing exponents $d_1, \ldots, d_i$. Then, through the use of number-theoretic algorithms (not described here, but known in the art), the computation of $s_1$ to the power $d_1$, $s_2$ to the power $d_2, \ldots, s_i$ to the power $d_i$ modulo N, may be carried out more efficiently together than i individual computations separately (provided the values $e_1, \ldots, e_i$ are distinct and satisfy certain other conditions).

As described above, SERTCA (as well as RTCA) has a digital certificate issued by a CA that certifies the public key used by the SERTCA for signatures on pre-computed OCSP responses that indicate the validity information of digital certificates. As also described above, the SERTCA digital certificate consists of a CA's digital signature securely binding together several quantities, such as: SN, a serial number unique to the certificate, PK, the public key of the SERTCA, ID the SERTCA's identifier, $D_1$, the issue date, $D_2$, the expiration date, and additional data. In symbols, $C=SIG_{CA}(SERTCA, SN, PK, ID, D_1, D_2, \ldots)$. In the case that RSA digital signatures are used by SERTCA, the SERTCA's public key PK takes the form (n, e), where n is the modulus and e is the verification exponent, and the certificate takes the form $$C=SIG_{CA}(SERTCA, SN, (n,e), ID, D_1, D_2, \ldots).$$

The RTC responders and relying parties may learn the SERTCA public key from the SERTCA certificate in an authenticated manner. However, as the traditional certificate contains only a single exponent e, a traditional certificate may not be suitable for use with Batch RSA, which uses multiple distinct exponents. Unless the verifiers (the RTC responders and/or relying parties) know the verification exponent used in a particular signature that authenticates validity information of digital certificates, the verifiers will not be able to verify the signature. The following overcomes this problem using Batch RSA within Batch OCSP.

In one approach, the SERTCA first generates a modulus n as in traditional RSA signatures, and presents n to the CA for certification as the public key of the SERTCA. The SERTCA protects its secret key, consisting of the primes p and q. The CA then issues SERTCA a digital certificate for the public key consisting solely of n. For example, the SERTCA certificate may take the form $C=SIG_{CA}(SN, n, ID, D_1, D_2, \ldots)$. The CA then informs the SERTCA of the statuses of user certificates of the SERTCA. The SERTCA then produces i signing exponents, $d_1, \ldots, d_i$ and corresponding verification exponents $e_1 \ldots e_i$. Independent of any relying-party request, the SERTCA generates statements about the validity statuses of one or more certificates for a given interval of time, combines the statements into batches of size i, and, using Batch RSA with exponents d1, ..., di within each batch, produces a digital signature for each statement. The SERTCA then sends the pre-computed signatures of validity status to unprotected responders, additionally including information that allows the responders and/or relying parties to identify, for each statement, the exponent ej to use for verifying each statement. The responders then store the SERTCA artificially pre-computed responses.

When relying parties ask responders for validity status information, RTC responders answer queries with artificially pre-computed responses. Each response, includes the verification exponent ej needed to verify the response, as well as (if needed) the SERTCA certificate. Relying parties may then verify the artificially pre-computed responses using RSA verification with modulus n obtained from the SERTCA certificate and verification exponent ej obtained from the RTC responder.

Variations of this approach are also possible. For instance, if the exponents are arbitrary (and no special messages formats are used prior to issue an RSA signature) an enemy may, having learned the SERTCA modulus n form a SERTCA certificate, looks for an exponent e that enables the enemy to produce the RSA signature of a false statement relative to n and e. To improve security, the SERTCA exponents e1, ..., ei may be fixed in advance (and may not need to be made available to responders each time). In particular, the exponents may be specified as part of the SERTCA certificate signed by the CA. The SERTCA certificate may then take the form:

$$C=SIG_{CA}(SERTCA, SN, (n, e1, \ldots, ei), ID, D_1, D_2, \ldots).$$

The relying party may also obtain the verification exponents from the SERTCA certificate or from another source, rather than from the responder.

It may be advantageous to enable the responders and/or relying parties to infer which exponent ej was used for a particular statement, rather than to indicate the information explicitly. For instance, such inference may be made if the j-th certificate validated in each batch always has serial numbers congruent to j modulo i. Then the responder and/or the relying party may be able to deduce the index j of the exponent simply from the serial number of the certificate whose validity is being verified.

Note that in this approach the relying party verification implementation may not follow the standard RSA signature verification paradigm, as the public key of the SERTCA may not be presented to the relying party as a pair (n, e). The cost of modifying existing relying-party RSA implementations may be prohibitive in some applications. This may be address by the following alternative approach.

For the second approach, the SERTCA initially generates a modulus n as in traditional RSA signatures, and i verification exponents e1, ..., ei, which the SERTCA presents to the CA for certification. It is advantageous for the SERTCA to protect n's prime factorization. The CA then issues SERTCA i digital certificates for the public keys consisting solely of PK1=(n, e1), PK2=(n, e2), ... PKi=(n, ei). For example, the i SERTCA certificate may take the form $C1=SIG_{CA}(SERTCA, SN, (n, e1), ID, D_1, D_2, \ldots ), \ldots, Ci=SIG_{CA}(SERTCA, SN, (n, ei), ID, D_1, D_2, \ldots )$. The CA then informs the SERTCA of the statuses of its user certificates. Following that, and independent of any relying-party request, the SERTCA generates statements about the validity statuses of one or more certificates for a given interval of time, combines the statements into batches of size i, and, using Batch RSA with exponents e1, ..., ei within each batch, produces a digital signature for each statement. The SERTCA then sends the pre-computed signatures of validity status to unprotected responders, additionally including information that allows the responders and/or relying parties to identify, for each statement, the exponent ej with which each statement was signed. The responders store the SERTCA-pre-computed responses.

When relying parties ask responders for validity status information, the RTC responders answer queries with the pre-computed responses. Each response that was signed with exponent ej may include, if needed or requested, the j-th SERTCA certificate Cj. Relying parties verify the pre-computed answers, using RSA verification with public key (n, ej) obtained from the SERTCA certificate. Note that the relying party verification is syntactically the same as standard RSA verification, because a standard-looking RSA public key is obtained from the SERTCA certificate. Thus, no modification of a standard RSA implementation may be needed for the relying party. In fact, the relying party may be completely unaware that the SERTCA is using Batch OCSP.

Variations of the approach discussed above are also possible. For instance, rather than choosing and presenting to the CA the exponents e1, ..., ej, such exponents may be inferred, or known in advance by the CA—e.g., because the exponents are fixed parameters of the system. Alternatively, the responders and/or relying parties may infer which exponent ej was used for a particular statement, rather than to indicate the exponent explicitly. For instance, such inference may be made if the j-th certificate validated in each batch always has serial number congruent to j modulo i. Then the responder and/or the relying party may be able to deduce the index j of the exponent simply from the serial number of the certificate whose validity is being verified.

Figure 19:
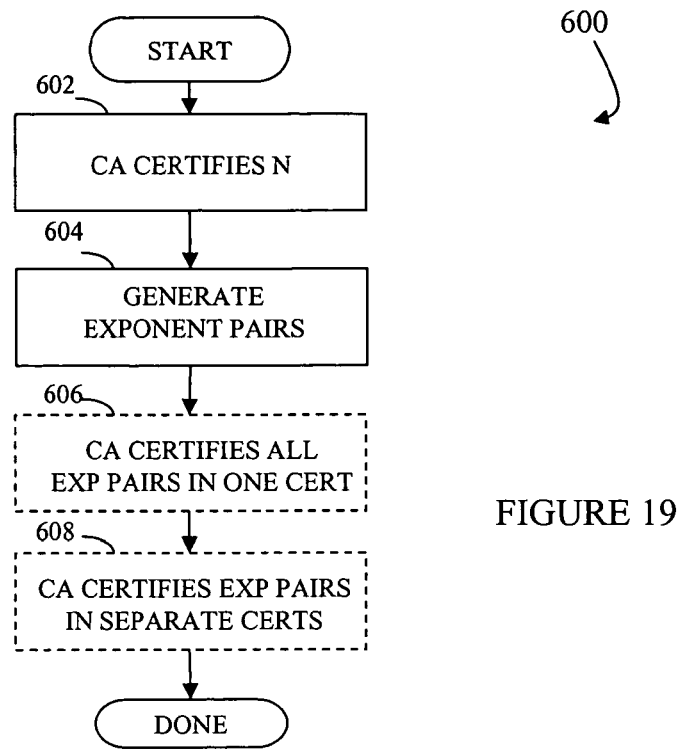
FIG. 19 is a flow chart illustrating providing information to an RTCA/SERTCA/OCSP responder for batch OCSP processing according to an embodiment of the system described herein.

Referring to FIG. 19, a flow chart 600 illustrates steps performed in connection with initializing the SERTCA (or RTCA or OCSP responder as appropriate) for performing batch OCSP. Processing begins at a first step 602 where the CA certifies the modulas, n. Following the step 602 is a step 604 where the i exponent pairs (verification exponents and signing exponents) are generated. In an embodiment herein, the exponent pairs are generated by the SERTCA using a pair of secret prime numbers, the product of which equals n. However, for other embodiments, it is possible to have other entities generate the exponent pairs at the step 604 and to use other algorithms for generating the pairs.

For some embodiments, processing may be complete after the step 604. However, other embodiments may include additional certifications by the CA, as described above, including having the CA certify the verification exponents e1, e2 ... ei. In one embodiment, illustrated by a step 606, the CA certifies the i verification exponents in a single certificate, as described above. In another embodiment, illustrated by the step 608, the CA certifies i separate certificates showing an RSA style public key of n, ek where ek is one of the i verification exponents.

Figure 20:
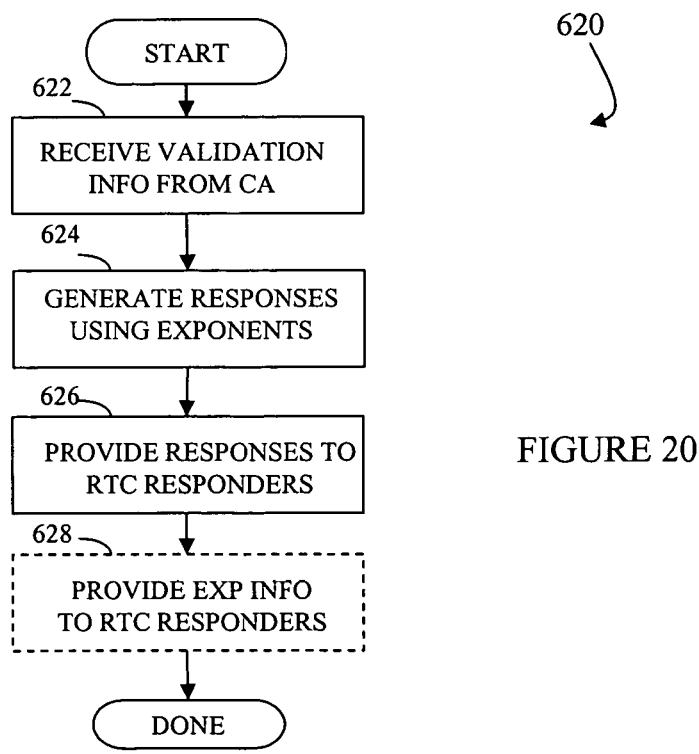
FIG. 20 is a flow chart illustrating providing information to RTC responders for batch OCSP processing according to an embodiment of the system described herein.

Referring to FIG. 20, a flow chart 620 illustrates steps performed by the SERTCA (or RTCA, or OCSP responder, as appropriate) in connection with generating the artificially pre-computed responses. Processing begins at a first step 622 where the CA provides validation information to the SERTCA, as described elsewhere herein. Following step 622 is a step 624 where the SERTCA generates the artificially pre-computed responses using the signing exponents d1, d2 . . . di. Following the step 624 is a step 626 where the SERTCA provides the artificially pre-computed responses to the RTC responders in an manner similar to that discussed elsewhere herein.

In some embodiments, the SERTCA may provide additional exponent information to the RTC responders. This is illustrated by an optional step 628 shown in flow chart 620 of FIG. 20. The additional exponent information may consist of one or more of certifications of the particular exponents being used and/or information indicating which particular exponents to use for which artificially pre-computed responses. Of course, as discussed elsewhere herein, there may be other mechanisms to determine which exponents to use for which artificially pre-computed responses so that it is not necessary for the SERTCA to separately provide that information. Similarly, there may be mechanisms for communicating exponent information to the RTC responders (and ultimately to relying parties) so that it may not be necessary to separately provide any additional certification for the exponents.

Note that the above described batch OCSP techniques may be applied as well to use with RTCA's instead of SERTCA and may also be applied as well to a conventional OCSP framework, where an OCSP responder computes digitally signed certificate-status information upon receiving queries from relying parties. In particular, if an OCSP responder receives an isolated query, the OCSP responder may produce an individual RSA-signed response, but if the OCSP responder receives many queries in a short amount of time, the OCSP responder may answer all or some of the queries in a batch mode as described above. The following illustrates this.

Initially, the CA informs an OCSP responder of the statuses of its user certificates in a manner consistent with OCSP. Upon receiving a multiplicity of certificate status queries, the responder may use batch RSA to compute independent, single-certificate, traditional OCSP responses to i of the queries, each relative to an exponent ej. The OCSP responder may also specify the correspondent exponent and/or include a CA-signed responder certificate that authenticates that ej (and a proper RSA modulus n) may be used to verify the responder signatures. The CA may provide the OCSP responder with a single OCSP-responder certificate specifying only the RSA modulus n used by the responder for its bath RSA signatures. For instance, in symbols, $C=SIG_{CA}(\text{responder},SN,n,ID,D_1,D_2,\ldots)$.

Note that this may be particularly adequate and secure if the exponents used by an OCSP responder is fixed. Alternatively, the CA may provide the OCSP responder with a responder certificate that specifies a multiplicity of exponents that the responder may use for batch RSA signing. For instance, in symbols, $C=SIG_{CA}(\text{responder},SN,(n,e1,\ldots,ek),ID,D_1,D_2,\ldots)$.

Alternatively, the CA may issue, for a particular OCSP responder, k distinct responder certificates, one for each exponent that the responder may use for batch RSA signing. For instance, in symbols, $C1=SIG_{CA}(\text{responder},SN,(n,e1),ID,D_1,D_2,\ldots);\ldots$
$;Ck=SIG_{CA}(\text{responder},SN,(n,ek),ID,D_1,D_2,\ldots)$.

Throughout this the discussion herein, a CA/RTCA/responder/party/user may be any entity (e.g., person, organization, server, device, computer program, computer file) or a collection of entities. Certificates should be understood to include all kinds of certificates, and in particular hierarchical certificates and flat certificates. See, for example, U.S. Pat. No. 5,420,927, which is incorporated by reference herein. Validity status and proofs of validity status may include validity status and proofs of validity status for hierarchical certificates (e.g., validity status and proofs of validity status of all certificates in a chain of certificates). Verifying the validity of a certificate C may include verifying the validity of the CA certificate for the CA having issued C, as well as the validity of the RTCA/SERTCA certificate for the RTCA/SERTCA that provides a signed response about the validity status of C.

Digital signing and digital signatures should, in instances where appropriate, be understood herein to include any proper authentication of information.

Though certificates describe digitally signed documents binding given keys to given users, following U.S. Pat. No. 5,666,416 (incorporated by reference herein), certificates should also be understood to include all kinds of digitally signed documents. For instance, a vendor, acting as a CA, may certify a price list under its control by digitally signing the price list (possibly together with date information). It may be useful to know the validity status of such a certificate. For instance, a vendor may want to prove the current validity of a price list (and refuse honor a given price in a price list, unless a proof of its currently validity is shown). Thus a customer may wish to ascertain the current validity of a price list document. The system described herein may be used for this. The system described herein may be used to prove the current validity of Web pages. In some embodiments, the RTCA/SERTCA generated proofs of current validity may be stored with (or in association with) the pages themselves. In such a case, then, a party may be considered a computer file.

Sending a piece of data D (to party X) should be understood to include making D available (or causing X to receive D).

Note that the system described herein may be implemented using hardware, software, or some combination thereof including, without limitation, a general purpose computer programmed to provide the functionality described herein possible in combination with dedicated hardware, such as digital signal processing hardware.

While the invention has been disclosed in connection with various embodiments, modifications thereon will be readily apparent to those skilled in the art. Accordingly, the spirit and scope of the invention is set forth in the following claims.

What is claimed is:
1. A method of providing information about digital certificate validity from a server having at least one computer processor, comprising:
the server using the at least one computer processor to receive, from an other server, digital signatures of artificially pre-computed messages to provide OCSP (Online Certificate Status Protocol) format responses that respond to OCSP queries about specific digital certificates in the set of digital certificates, wherein the other server uses at least one computer processor to generate the plurality of artificially pre-computed messages about the validity status of at least a subset of the set of digital certificates of the plurality of digital certificates after ascertaining digital certificate validity status for each of a plurality of digital certificates in a set of digital certificates;

the server using the at least one computer processor to receive a request for validity status of at least one digital certificate; and the server using the at least one computer processor to respond to the request by providing at least one of the artificially pre-computed messages that have been digitally signed, wherein no secret keys are stored on the server and wherein generating and digitally signing pre-computed messages to provide OCSP format responses occur prior to any OCSP queries that are answered by any of the OCSP format responses.

2. The method, according to claim 1, wherein ascertaining digital certificate validity status includes obtaining authenticated information about digital certificates.

3. The method, according to claim 2, wherein the authenticated information about digital certificates is generated by an entity that also revokes certificates.

4. The method, according to claim 2, wherein the authenticated information about digital certificates is a CRL (Certificate Revocation List).

5. The method, according to claim 1, wherein responses are generated for at least all non-revoked digital certificates in the set of digital certificates.

6. The method, according to claim 1, further comprising:
making available to the servers a special digital certificate containing a public verification key used to verify the digital signatures provided in connection with digitally signing the artificially pre-computed messages.

7. The method, according to claim 6, wherein an entity that issues the special digital certificate also issues certificates of the set of digital certificates.

8. The method, according to claim 1, wherein generating a plurality of artificially pre-computed messages and digitally signing the artificially pre-computed messages are performed at given time intervals.

9. The method, according to claim 8, wherein the artificially pre-computed messages include time information corresponding to when the artificially pre-computed messages were generated.

10. A non-transitory computer-readable storage medium storing computer software that provides information about digital certificate validity, the computer software comprising:
executable code that, when executed on a computer processor of a server, receives, from an other server, digital signatures of artificially pre-computed messages to provide OCSP (Online Certificate Status Protocol) format responses that respond to OCSP queries about specific digital certificates in the set of digital certificates, wherein the other server uses at least one computer processor to generate the plurality of artificially pre-computed messages about the validity status of at least a subset of the set of digital certificates of the plurality of digital certificates after ascertaining digital certificate validity status for each of a plurality of digital certificates in a set of digital certificates;

executable code that, when executed on a computer processor, receives a request for validity status of at least one digital certificate; and executable code that, when executed on a computer processor, responds to the request by providing at least one of the artificially pre-computed messages that have been digitally signed, wherein no secret keys are stored on the server and wherein generating and digitally signing pre-computed messages to provide OCSP format responses occur prior to any OCSP queries that are answered by any of the OCSP format responses.

11. The computer-readable storage medium, according to claim 10, wherein ascertaining digital certificate validity status includes obtaining authenticated information about digital certificates.

12. The computer-readable storage medium, according to claim 11, wherein the authenticated information about digital certificates is generated by an entity that also revokes certificates.

13. The computer-readable storage medium according to claim 11, wherein the authenticated information about digital certificates is a CRL (Certificate Revocation List).

14. The computer-readable storage medium, according to claim 10, wherein responses are generated for at least all non-revoked digital certificates in the set of digital certificates.

15. The computer-readable storage medium, according to claim 10, further comprising:
executable code that makes available to the server a special digital certificate containing a public verification key used to verify the digital signatures provided in connection with digitally signing the artificially pre-computed messages.

16. The computer-readable storage medium, according to claim 15, wherein an entity that issues the special digital certificate also issues certificates of the set of digital certificates.

17. The computer-readable storage medium, according to claim 10, wherein the other server generates and signs the OCSP format responses at given time intervals.

* * * * *